(12) United States Patent
Hickie et al.

(10) Patent No.: US 11,772,015 B2
(45) Date of Patent: *Oct. 3, 2023

(54) APPARATUS, SYSTEMS, AND METHODS FOR AUTOMATED SEPARATION OF SAND FROM A WELLBORE SLURRY

(71) Applicant: INFINITE AUTOMATED SOLUTIONS LLC, Oklahoma City, OK (US)

(72) Inventors: Barton Hickie, Oklahoma City, OK (US); Billy Christian Rowell, Duncan, OK (US); Johnny Thomas Gaulf, Edmond, OK (US)

(73) Assignee: INFINITE AUTOMATED SOLUTIONS LLC, Oklahoma City, OK (US)

( * ) Notice: Subject to any disclaimer, the term of this patent is extended or adjusted under 35 U.S.C. 154(b) by 53 days.

This patent is subject to a terminal disclaimer.

(21) Appl. No.: 17/509,777

(22) Filed: Oct. 25, 2021

(65) Prior Publication Data

US 2022/0054957 A1 Feb. 24, 2022

Related U.S. Application Data

(62) Division of application No. 16/684,967, filed on Nov. 15, 2019, now Pat. No. 11,154,796.

(Continued)

(51) Int. Cl.
| | | |
|---|---|---|
| *B01D 21/34* | (2006.01) | |
| *B01D 21/30* | (2006.01) | |
| *B01D 21/26* | (2006.01) | |

(52) U.S. Cl.
CPC ........... *B01D 21/34* (2013.01); *B01D 21/267* (2013.01); *B01D 21/302* (2013.01)

(58) Field of Classification Search
CPC .... B01D 21/34; B01D 21/267; B01D 21/302; B01D 21/245; B01D 21/26; B01D 21/30;
(Continued)

(56) References Cited

U.S. PATENT DOCUMENTS 5,879,541 A * 3/1999 Parkinson .......... B01D 21/2411
422/267
6,158,512 A 12/2000 Unsgaard
(Continued)

FOREIGN PATENT DOCUMENTS

| CA | 2396682 | 2/2002 |
|---|---|---|
| CN | 105840168 A | 8/2016 |

(Continued)

OTHER PUBLICATIONS

International Search Report and Written Opinion issued by the ISA/US regarding International application No. PCT/US2019/061631 dated Jan. 31, 2020, 15 pages.

*Primary Examiner* — Akash K Varma
(74) *Attorney, Agent, or Firm* — HAYNES AND BOONE, LLP

(57) ABSTRACT

Sand separation systems and methods according to which one or more energy sensors are adapted to detect a response to energy imparted to a sand separator of a known type. One or more computers are adapted to communicate with the one or more energy sensors. The one or more computers and/or the one or more energy sensors are pre-tuned. The one or more computers are configured to determine the unknown sand level in the sand separator of the known type based on: the response detected by the one or more energy sensors, and the pre-tuning of the one or more energy sensors and/or the one or more computers.

20 Claims, 12 Drawing Sheets

Related U.S. Application Data

(60) Provisional application No. 62/867,567, filed on Jun. 27, 2019, provisional application No. 62/768,418, filed on Nov. 16, 2018.

(58) Field of Classification Search
CPC ... B01D 2221/04; E21B 21/06; E21B 21/063; E21B 21/065; E21B 21/066; E21B 43/34
USPC ........................................................ 210/744
See application file for complete search history.

(56) References Cited

U.S. PATENT DOCUMENTS

| | | |
|---|---|---|
| 6,192,752 B1 | 2/2001 | Blaine |
| 6,672,335 B1 | 1/2004 | Welborn |
| 6,790,367 B2 | 9/2004 | Schmigel et al. |
| 7,114,390 B2 | 10/2006 | Lizon et al. |
| 7,162,922 B2 | 1/2007 | Freger et al. |
| 7,481,106 B2 | 1/2009 | Freger |
| 8,469,116 B2 | 6/2013 | Larson |
| 9,711,038 B1 | 7/2017 | Pennebaker, III |
| 9,938,812 B2 | 4/2018 | Hemstock |
| 10,068,467 B1 | 9/2018 | Pennebaker, Iii |
| 10,155,230 B2 | 12/2018 | Stone |
| 2005/0011646 A1 | 1/2005 | Appleford et al. |
| 2011/0198080 A1 | 8/2011 | Demong |
| 2012/0118798 A1 | 5/2012 | Scott et al. |
| 2012/0145642 A1 | 6/2012 | Bozak |
| 2013/0263657 A1 | 10/2013 | Sides |
| 2014/0318644 A1 | 10/2014 | Hollingsaeter |
| 2014/0345727 A1 | 11/2014 | Gilmore et al. |
| 2014/0357464 A1* | 12/2014 | Stone ..................... E21B 43/34 494/10 |
| 2016/0059153 A1 | 3/2016 | Smith et al. |
| 2016/0281447 A1 | 9/2016 | Jones et al. |
| 2016/0312597 A1 | 10/2016 | Arefjord |
| 2016/0375386 A1 | 12/2016 | Magnus et al. |
| 2017/0096877 A1 | 4/2017 | Tolman et al. |
| 2017/0204691 A1 | 7/2017 | Xue et al. |
| 2019/0063984 A1 | 2/2019 | Bowley |

FOREIGN PATENT DOCUMENTS

| | | |
|---|---|---|
| CN | 106194150 A | 12/2016 |
| CN | 108612513 A | 10/2018 |
| GB | 2284053 A | 5/1995 |
| WO | WO2015005998 A1 | 1/2015 |
| WO | WO2016094480 A1 | 6/2016 |

* cited by examiner

```
                                    255
                                     ↓

260 ─┐  DETERMINING, INDEPENDENTLY OF THE SAND DETECTION SYSTEM 240,
     │  A FIRST LEVEL OF SEPARATED SAND WITHIN THE SAND SEPARATOR 130

265 ─┐  IMPARTING, USING ONE OR MORE OF THE ENERGY EMITTERS
     │  245A-C, FIRST ENERGY TO THE SAND SEPARATOR 130

270 ─┐  WHEN THE FIRST LEVEL OF SEPARATED SAND IS DISPOSED WITHIN THE SAND
     │  SEPARATOR 130, DETECTING, USING ONE OR MORE OF THE ENERGY SENSORS 250A-C,
     │  A FIRST RESPONSE TO THE FIRST ENERGY IMPARTED TO THE SAND SEPARATOR 130

275 ─┐  DETERMINING, INDEPENDENTLY OF THE SAND DETECTION SYSTEM 240,
     │  A SECOND LEVEL OF SEPARATED SAND WITHIN THE SAND SEPARATOR 130

280 ─┐  IMPARTING, USING ONE OR MORE OF THE ENERGY EMITTERS
     │  245A-C, SECOND ENERGY TO THE SAND SEPARATOR 130

285 ─┐  WHEN THE SECOND LEVEL OF SEPARATED SAND IS DISPOSED WITHIN THE SAND
     │  SEPARATOR 130, DETECTING, USING ONE OR MORE OF THE ENERGY SENSORS 250A-C,
     │  A SECOND RESPONSE TO THE SECOND ENERGY IMPARTED TO THE SAND SEPARATOR 130

290 ─┐  TUNING THE SAND DETECTION SYSTEM 240 BASED ON THE INDEPENDENTLY
     │  DETERMINED FIRST LEVEL, THE DETECTED FIRST RESPONSE, THE INDEPENDENTLY
     │  DETERMINED SECOND LEVEL, AND THE DETECTED SECOND RESPONSE

295 ─┐  IMPARTING, USING ONE OR MORE OF THE ENERGY EMITTERS
     │  245A-C, THIRD ENERGY TO THE SAND SEPARATOR 130

300 ─┐  WHEN THE SAND SEPARATOR 130 IS FILLED WITH A THIRD LEVEL OF SEPARATED
     │  SAND, DETECTING, USING ONE OR MORE OF THE ENERGY SENSORS 250A-C,
     │  A THIRD RESPONSE TO THE THIRD ENERGY IMPARTED TO THE SAND SEPARATOR 130

305 ─┐  DETERMINING, USING THE SAND DETECTION SYSTEM 240 AND BASED ON
     │  THE TUNING AND THE DETECTED THIRD RESPONSE, THE THIRD LEVEL

310 ─┐  DUMPING AT LEAST A PORTION OF THE SEPARATED SAND FROM THE
     │  SAND SEPARATOR 130 BASED ON THE DETERMINED THIRD LEVEL
```

Fig. 5

APPARATUS, SYSTEMS, AND METHODS FOR AUTOMATED SEPARATION OF SAND FROM A WELLBORE SLURRY

CROSS-REFERENCE TO RELATED APPLICATIONS

This application is a division of U.S. application Ser. No. 16/684,967 ("the '967 Application"), filed Nov. 15, 2019, the entire disclosure of which is hereby incorporated herein by reference.

The '967 Application claims the benefit of the filing date of, and priority to, U.S. Application Ser. No. 62/768,418, filed Nov. 16, 2018, the entire disclosure of which is hereby incorporated herein by reference.

The '967 Application also claims the benefit of the filing date of, and priority to, U.S. Application Ser. No. 62/867,567, filed Jun. 27, 2019, the entire disclosure of which is hereby incorporated herein by reference.

TECHNICAL FIELD

The present disclosure relates generally to sand separators for use in oil and gas operations and, more particularly, to apparatus, systems, and methods for automated separation of sand from a wellbore slurry.

BRIEF DESCRIPTION OF THE DRAWINGS

FIG. 5 is a flow diagram of another method for implementing one or more embodiments of the present disclosure.

DETAILED DESCRIPTION

Figure 1:
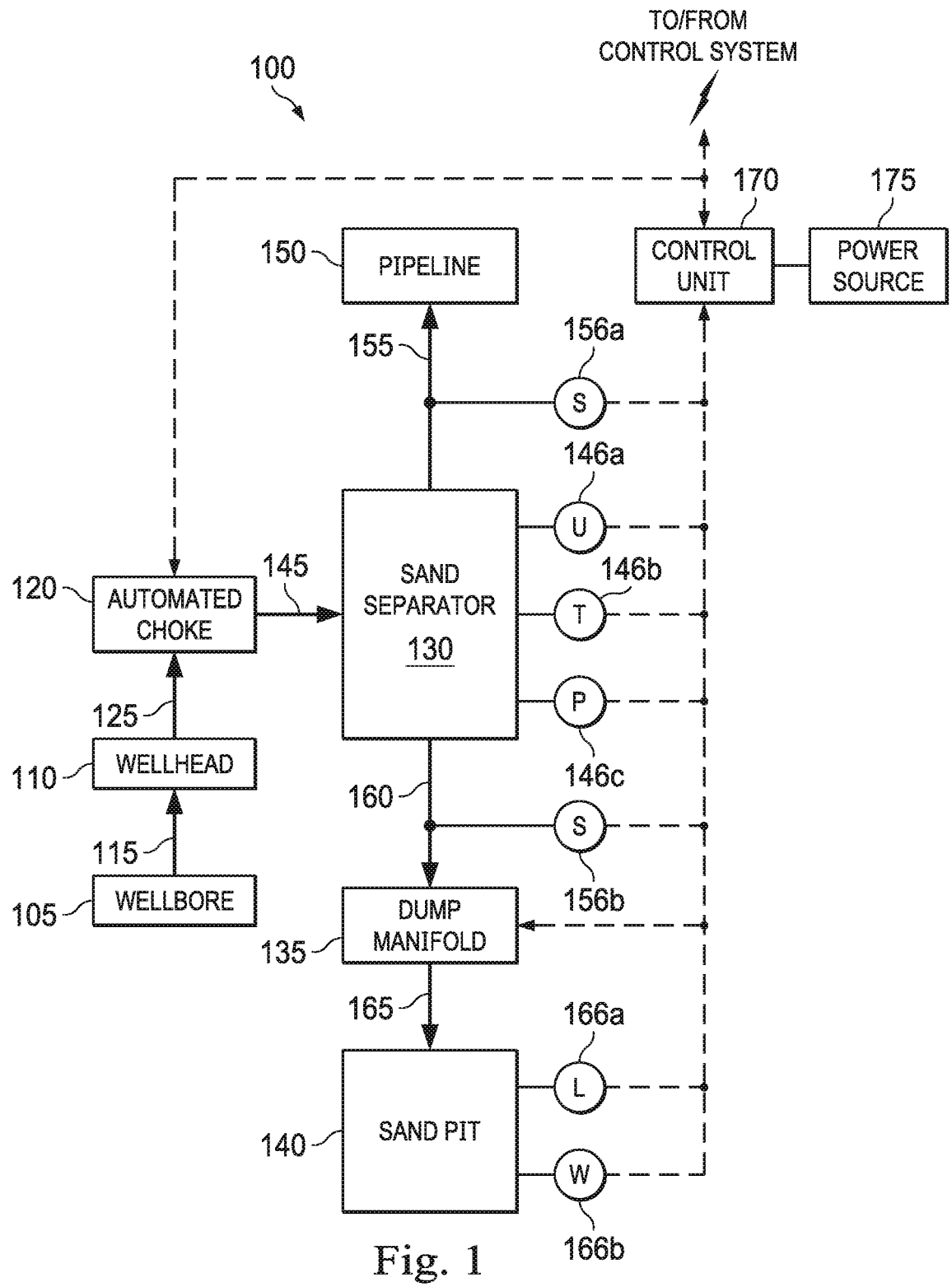
FIG. 1 is a diagrammatic illustration of a sand separation system including a sand separator, a dump manifold, and a sand pit, according to one or more embodiments of the present disclosure.
Figure 2A:
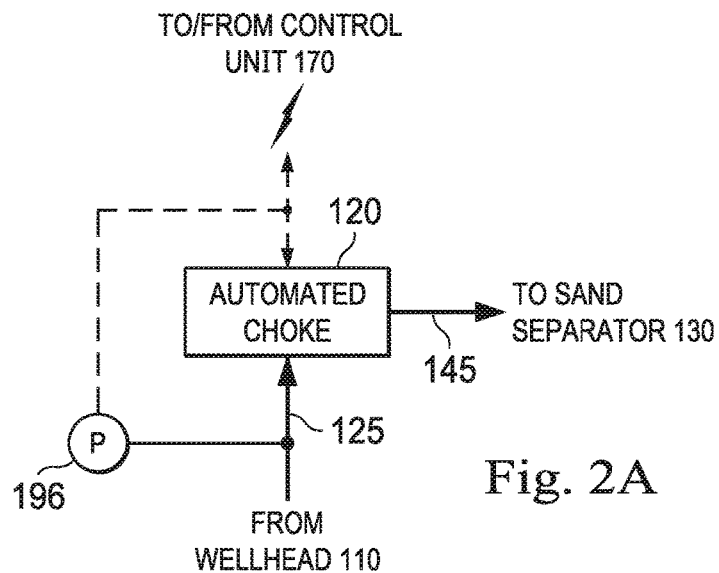
FIG. 2A is a diagrammatic illustration of an automated choke of the sand separation system of FIG. 1, according to one or more embodiments of the present disclosure.

Referring to FIG. 1, in an embodiment, a sand separation system is schematically illustrated and generally referred to by the reference numeral 100. The sand separation system 100 is adapted to remove sand from a wellbore slurry (e.g., a fracturing (or "frac") flowback stream, a production stream, or both). The wellbore slurry is adapted to be received from a wellbore 105 that traverses one or more subterranean formations. A wellhead 110 is adapted to receive the wellbore slurry from the wellbore 105, as indicated by arrow 115. The wellhead 110 serves as the surface termination of the wellbore 105. An automated choke 120 is adapted to receive the wellbore slurry from the wellhead 110, as indicated by arrow 125, and to adjust the flow of the wellbore slurry exiting the wellhead 110. Turning additionally to FIG. 2A, in some embodiments, the sand separation system 100 includes a pressure sensor 196. Before, during, and/or after the automated choke 120 receives the wellbore slurry from the wellhead 110, as indicated by the arrow 125, the pressure sensor 196 is adapted to monitor the pressure of the wellbore slurry exiting the wellhead 110. In some embodiments, as in FIGS. 1 and 2A, the sand separation system 100 further includes one or more computers such as, for example, a control unit 170, is/are adapted to communicate with the automated choke 120 and to receive data/signals from the pressure sensor 196 or other sensors. For example, one or more computers may send control signals to the automated choke 120 and/or receive choke position data from the automated choke 120. A power source 175 provides electrical power to the one or more computers. In some embodiments, the power source 175 is or includes a solar panel, a wind turbine, a generator, a power line, or the like. In some embodiments, as in FIG. 1, the one or more computers is/are, include, is/are part of, or is/are further adapted to communicate with a control system (e.g., a supervisory control and data/signals acquisition (SCADA) system, an electronic drilling recorder (EDR) system, a remote console, or the like).

The sand separation system 100 includes a sand separator 130, a dump manifold 135, and a sand pit 140 (e.g., in the form of, or including, a storage tank), as shown in FIG. 1. The sand separator 130 is adapted to receive the wellbore slurry from the automated choke 120, as indicated by arrow 145, which automated choke 120 is consequently adapted to adjust the flow of the wellbore slurry from the wellhead 110 to the sand separator 130. After receiving the wellbore slurry, the sand separator 130 is adapted to separate the wellbore slurry into a fluids stream and a sand stream; the sand stream includes sand, which sand includes sand, other solid materials, or a combination of sand and other solid materials. In some embodiments, as in FIG. 1, the sand separation system 100 further includes an ultrasonic sensor 146a, a temperature sensor 146b, and a pressure sensor 146c. Before, during, and/or after the sand separator 130 separates the wellbore slurry into the fluids stream and the sand stream, the ultrasonic sensor 146a and the temperature sensor 146b are adapted to monitor the amount of sand accumulated in the sand separator 130, and the pressure sensor 146c is adapted to monitor the pressure in the sand separator 130. In some embodiments, as in FIG. 1, the one or more computers (e.g., the control unit 170) is/are further adapted to receive data/signals from the ultrasonic sensor 146a, the temperature sensor 146b, the pressure sensor 146c, or any combination thereof. In some embodiments, the ultrasonic sensor 146a is, includes, or is part of an ultrasonic echo sensor at the sand separator 130. In some embodiments, the pressure sensor 146c is or includes multiple pressure sensors adapted to measure a pressure differential across the sand separator 130. In some embodiments, the temperature sensor 146b is, includes, or is part of a thermal dispersion switch at the sand separator 130. In some embodiments, the temperature sensor 146b is, includes, or is part of a thermal imaging device (e.g., a FLIR camera, another infrared camera, or similar optical sensor). In some embodiments, one or more of the ultrasonic sensor 146a, the temperature sensor 146b, and the pressure sensor 146c are located internally within the sand separator 130. In some embodiments, in addition to the ultrasonic sensor 146a, the temperature sensor 146b, and/or the pressure sensor 146c, another level sensor may be located internally within the sand separator 130.

A pipeline 150 is adapted to receive the fluids stream from the sand separator 130, as indicated by arrow 155, and to transport the fluids stream for further processing to other equipment (e.g., a tank battery), another facility (e.g., a customer facility), a sales channel, or any combination thereof. In some embodiments, as in FIG. 1, the sand separation system 100 further includes a sand sensor 156a. Before, during, and/or after the pipeline 150 receives the fluids stream from the sand separator 130, as indicated by the arrow 155, the sand sensor 156a is adapted to monitor the amount of sand in the fluids stream exiting the sand separator 130. In some embodiments, as in FIG. 1, the one or more computers (e.g., the control unit 170) is/are further adapted to receive data/signals from the sand sensor 156a. In some embodiments, the sand sensor 156a is, includes, or is part of a sand probe erosion detection sensor at the fluid stream outlet of the sand separator 130. In some embodiments, the sand sensor 156a may be or include an acoustic sensor.

The dump manifold 135 is adapted to receive the sand stream from the sand separator 130, as indicated by arrow 160, and to prevent, allow, and adjust the flow of the sand stream exiting the sand separator 130. In some embodiments, as in FIG. 1, the sand separation system 100 further includes a sand sensor 156b. Before, during, and/or after the dump manifold 135 receives the sand stream from the sand separator 130, as indicated by the arrow 160, the sand sensor 156b is adapted to monitor the amount of sand in the sand stream exiting the sand separator 130. In some embodiments, as in FIG. 1, the one or more computers (e.g., the control unit 170) is/are further adapted to receive data/signals from the sand sensor 156b. In some embodiments, the sand sensor 156b is, includes, or is part of a sand probe erosion detection sensor at the fluid stream outlet of the sand separator 130. In some embodiments, the sand sensor 156b may be or include an acoustic sensor.

Figure 2B:
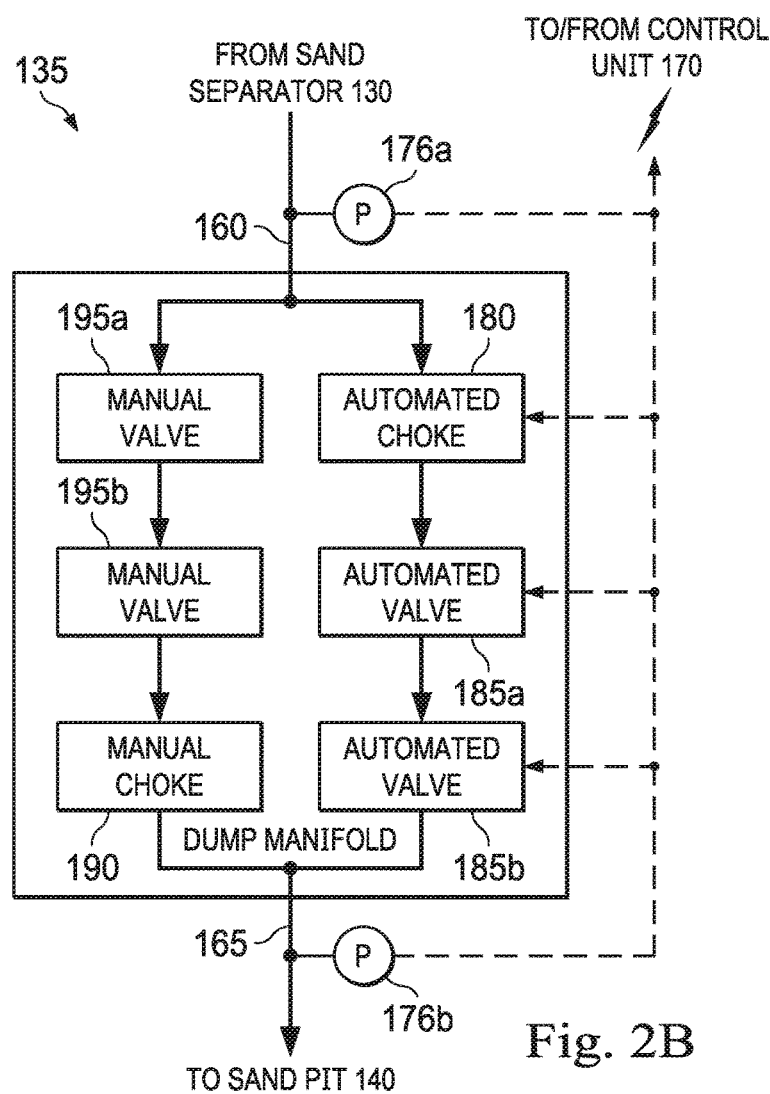
FIG. 2B is a diagrammatic illustration of the dump manifold of FIG. 1, according to one or more embodiments of the present disclosure.

Turning additionally to FIG. 2B, in some embodiments, the sand separation system 100 further includes pressure sensors 176a and 176b. Before, during, and/or after the dump manifold 135 receives the sand stream from the sand separator 130, as indicated by the arrow 160, the pressure sensor 176a is adapted to monitor the pressure of the sand stream entering the dump manifold 135. Similarly, before, during, and/or after the sand pit 140 receives the sand stream from the dump manifold 135, as indicated by the arrow 165, the pressure sensor 176b is adapted to monitor the pressure of the sand stream exiting the dump manifold 135. In some embodiments, as in FIG. 2B, the one or more computers (e.g., the control unit 170) is/are further adapted to receive data/signals from the pressure sensor 176a, the pressure sensor 176b, or both.

As shown in FIG. 2B, in an embodiment, the dump manifold 135 includes an automated choke 180 and automated valves 185a-b. The automated choke 180 is adapted to receive the sand stream from the sand separator 130. The automated valves 185a-b are adapted to receive the sand stream from the automated choke 180. As a result, the automated choke 180 and the automated valves 185a-b, in combination, define a first flow path between the sand separator 130 and the sand pit 140. The automated valves 185a-b are adapted to allow or prevent flow of the sand stream exiting the sand separator 130 via the first flow path. Thus, when the automated valves 185a-b are closed, flow of the sand stream exiting the sand separator 130 via the first flow path is prevented, or at least reduced. In contrast, when the automated valves 185a-b are open, flow of the sand stream exiting the sand separator 130 via the first flow path is allowed and the automated choke 180 is adapted to adjust the flow of the sand stream from the sand separator 130 to the sand pit 140 via the first flow path. In some embodiments, as in FIG. 2B, the one or more computers (e.g., the control unit 170) is/are further adapted to communicate with the automated choke 180, the automated valves 185a-b, or any combination thereof. For example, the one or more computers may send control signals to the automated choke 180 and/or receive choke position data from the automated choke 180. For another example, the one or more computers may send control signals to the automated valves 185a-b and/or receive valve position data from the automated valves 185a-b.

In some embodiments, the automated choke 180 is a pneumatic choke such as, for example, a 2-inch pneumatic choke. However, the automated choke 180 may be smaller or larger than 2-inches. In some embodiments, one or both of the automated valves 185a-b are gate valves such as, for example, 2-inch pneumatic gate valves. In other embodiments, one or more of the automated choke 180 and the automated valves 185a-b may instead be hydraulically or electrically actuable. In some embodiments, the automated choke 180 and the automated valves 185a-b are rated for 10,000 psi (i.e., each has a 10k rating). However, the automated choke 180 and the automated valves 185a-b may be rated for higher or lower than 10,000 psi. Although FIG. 2B illustrates one arrangement of the automated choke 180 and the automated valves 185a-b defining the first flow path, the automated choke 180 and the automated valves 185a-b may instead be rearranged to define the first flow path in any order without departing from the scope of the present disclosure.

In some embodiments, as in FIG. 2B, the dump manifold 135 further includes a manual choke 190 and manual valves 195*a-b*. The manual valves 195*a-b* are adapted to receive the sand stream from the sand separator 130. The manual choke 190 is adapted to receive the sand stream from the manual valves 195*a-b*. As a result, the manual choke 190 and the manual valves 195*a-b*, in combination, define a second flow path between the sand separator 130 and the sand pit 140. The manual valves 195*a-b* are adapted to allow or prevent flow of the sand stream exiting the sand separator 130 via the second flow path. Thus, when the manual valves 195*a-b* are closed, flow of the sand stream exiting the sand separator 130 via the second flow path is prevented, or at least reduced. In contrast, when the manual valves 195*a-b* are open, flow of the sand stream exiting the sand separator 130 via the second flow path is allowed and the manual choke 190 is adapted to adjust the flow of the sand stream from the sand separator 130 to the sand pit 140 via the second flow path.

In some embodiments, the manual choke 190 is a 2-inch manual choke. However, the manual choke 190 may be smaller or larger than 2-inches. In some embodiments, one or both of the manual valves 195*a-b* are plug valves such as, for example, 2-inch plug valves. Although FIG. 2B illustrates one arrangement of the manual choke 190 and the manual valves 195*a-b* defining the second flow path, the manual choke 190 and the manual valves 195*a-b* may instead be rearranged to define the second flow path in any order without departing from the scope of the present disclosure. In some embodiments, the manual choke 190 and the manual valves 195*a-b* provide additional capacity for dumping of the sand accumulated in the sand separator 130 into the sand pit 140. Thus, dumping of the sand accumulated in the sand separator 130 into the sand pit 140 may include dumping via the first flow path (i.e., including the automated choke 180 and the automated valves 185*a-b*), the second flow path (i.e., including the manual choke 190 and the manual valves 195*a-b*), or both. In some embodiments, the manual choke 190 and the manual valves 195*a-b* are provided for redundancy so that the automated choke 180 and/or the automated valves 185*a-b* can be taken out of service for maintenance, repair, or replacement without shutting down the sand separation system 100.

As shown in FIG. 1, the sand pit 140 is adapted to receive the sand stream from the dump manifold 135, as indicated by arrow 165, which dump manifold 135 is consequently adapted to adjust the flow of the sand stream from the sand separator 130 to the sand pit 140. In some embodiments, the sand pit 140 is a stainless-steel vessel. In some embodiments, as in FIG. 1, the sand separation system 100 further includes a level sensor 166*a* and a weight sensor 166*b*. Before, during, and/or after the sand pit 140 receives the sand stream from the dump manifold 135, as indicated by the arrow 165, the level sensor 166*a* is adapted to monitor the amount of sand and fluid accumulated in the sand pit 140 and the weight sensor 166*b* is adapted to monitor the weight of the sand accumulated in the sand pit 140. In some embodiments, as in FIG. 1, the one or more computers (e.g., the control unit 170) is/are further adapted to receive data/signals from the level sensor 166*a*, the weight sensor 166*b*, or both. In some embodiments, the level sensor 166*a* is, includes, or is part of a radar sensor, a guided wave radar sensor, an electronic float sensor, a thermal imaging device such as a FLIR camera, or any combination thereof. For example, the level sensor 166*a* may include multiple sensors to provide redundancy.

Referring collectively to FIGS. 1, 2A, and 2B, in operation, the wellbore slurry flows from the wellbore 105 to the sand separator 130 via the wellhead 110 and the automated choke 120. In some embodiments, the flow of the wellbore slurry via the automated choke 120 may be supplemented with a manual choke that forms a choke manifold together with the automated choke 120. As the wellbore slurry flows from the wellbore 105 to the sand separator 130, the one or more computers (e.g., the control unit 170) communicate(s) control signals to the automated choke 120 and receive(s) data/signals from the pressure sensor 196. As a result, the one or more computers is/are able to adjust the flow of the wellbore slurry from the wellbore 105 to the sand separator 130 (using the automated choke 120) and monitor the pressure of the wellbore slurry exiting the wellhead 110 (using the pressure sensor 196). Alternatively, the automated choke 120 may be omitted in favor of a manual choke via which the wellbore slurry flows from the wellbore 105 to the sand separator 130. In any case, the sand separator 130 separates the wellbore slurry into the fluids stream, which is diverted to the pipeline 150, and the sand stream, which is diverted to the dump manifold 135.

As the wellbore slurry is separated into the fluids stream and the sand stream, the one or more computers (e.g., the control unit 170) receive(s) data/signals from the ultrasonic sensor 146*a*, the temperature sensor 146*b*, the pressure sensor 146*c*, the another level sensor located internally within the sand separator 130, or any combination thereof. As a result, the one or more computers is/are able to monitor the amount of sand accumulated in the sand separator 130 (using the ultrasonic sensor 146*a*, the temperature sensor 146*b*, or both) and the pressure in the sand separator 130 (using the pressure sensor 146*c*). Furthermore, as the fluids stream flows to the pipeline 150, the one or more computers receive(s) data/signals from the sand sensor 156*a*. As a result, the one or more computers is/are able to monitor the amount of sand in the fluids stream exiting the sand separator 130 (using the sand sensor 156*a*). Alternatively, the sand sensor 156*a* may be omitted so that the one or more computers is/are not able to monitor the amount of sand in the fluids stream exiting the sand separator 130.

As desired or necessary, as determined by the one or more computers (e.g., the control unit 170), the sand stream flows from the sand separator 130 to the sand pit 140 via the dump manifold 135. As the sand stream flows from the sand separator 130 to the sand pit 140, the one or more computers communicate(s) control signals to the automated choke 180, the automated valves 185*a-b*, or any combination thereof, and receives data/signals from the pressure sensor 176*a*, the pressure sensor 176*b*, the level sensor 166*a*, the weight sensor 166*b*, or any combination thereof. As a result, the one or more computers is/are able to adjust the flow of the sand stream from the sand separator 130 to the sand pit 140 via the first flow path (using the automated choke 180, the automated valves 185*a-b*, or any combination thereof) and monitor the pressure of the sand stream entering and exiting the dump manifold 135 (using the pressure sensors 176*a-b*, respectively), the amount of sand accumulated in the sand pit 140 (using the level sensor 166*a*), and the weight of the sand accumulated in the sand pit 140 (using the weight sensor 166*b*). Furthermore, as the sand stream flows from the sand separator 130 to the sand pit 140, the one or more computers receive(s) data/signals from the sand sensor 156*b*. As a result, the one or more computers is/are able to monitor the amount of sand in the sand stream exiting the sand separator 130 (using the sand sensor 156*b*). Alternatively, the sand sensor 156*b* may be omitted so that the one or more computers is/are not able to monitor the amount of sand in the fluids stream exiting the sand separator 130.

By adjusting the automated choke 120, the automated choke 180, the automated valves 185*a-b,* or any combination thereof, the one or more computers (e.g., the control unit 170) controls automated dumping of the sand stream from the sand separator 130 into the sand pit 140. In some embodiments, the one or more computers' automated control of the automated choke 120, the automated choke 180, and the automated valves 185*a-b* is based on data/signals received from the ultrasonic sensor 146*a,* the temperature sensor 146*b,* the pressure sensor 146*c,* the sand sensor 156*a,* the sand sensor 156*b,* the level sensor 166*a,* the weight sensor 166*b,* the pressure sensors 176*a,* 176*b,* and/or 196, or any combination thereof. In some embodiments, the one or more computers' automated control of the automated choke 120, the automated choke 180, and the automated valves 185*a-b* is based on periodic dumping of the sand separator 130 at periodic predetermined time intervals. Such time intervals may be adjusted occasionally by the one or more computers based on data/signals received from the ultrasonic sensor 146*a,* the temperature sensor 146*b,* the pressure sensor 146*c,* the sand sensor 156*a,* the sand sensor 156*b,* the level sensor 166*a,* the weight sensor 166*b,* the pressure sensors 176*a,* 176*b,* and/or 196, or any combination thereof. For example, data/signals received from the weight sensor 166*b* may be correlated by the one or more computers against the dump frequency and a known volume of the sand separator 130 to determine whether or not to adjust the dump frequency.

Figure 3:
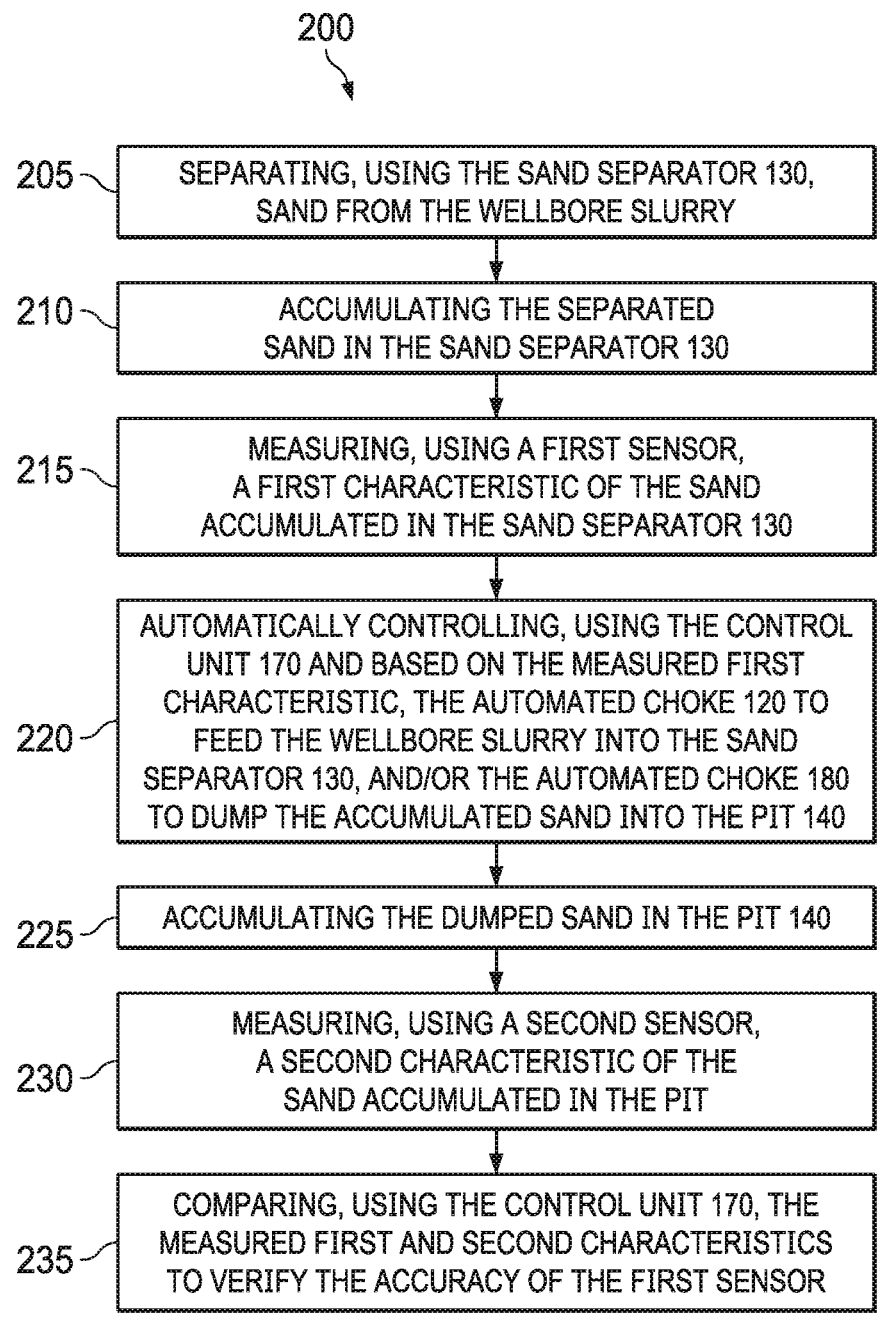
FIG. 3 is a flow diagram of a method for implementing one or more embodiments of the present disclosure.

Referring to FIG. 3, in an embodiment, a method of operating the sand separation system 100 is generally referred to by the reference numeral 200. The method 200 is carried out by receiving, at the one or more computers (e.g., the control unit 170), data/signals from the ultrasonic sensor 146*a,* the temperature sensor 146*b,* the pressure sensor 146*c,* the sand sensor 156*a,* the sand sensor 156*b,* the level sensor 166*a,* the weight sensor 166*b,* the pressure sensor 176*a,* the pressure sensor 176*b,* the pressure sensor 196, the another level sensor located internally within the sand separator 130, or any combination thereof, and sending, from the one or more computers, control signals to the automated choke 120, the automated choke 180, the automated valves 185*a-b,* or any combination thereof. The automated choke 120, the automated choke 180, and/or the automated valves 185*a-b* are adapted to send feedback regarding their respective positions (i.e., the degree to which each is open, closed, or transitioning) to the one or more computers, which feedback is utilized by the one or more computers (in combination with the sensor data/signals) to determine how to actuate the automated choke 120, the automated choke 180, and/or the automated valves 185*a-b.*

The method includes at a step 205, separating, using the sand separator 130, sand from the wellbore slurry. At a step 210, the separated sand is accumulated in the sand separator 130. At a step 215, a first characteristic of the sand accumulated in the sand separator 130 is measured using a first sensor. In some embodiments of the step 215, the first sensor is the ultrasonic sensor 146*a* and the first characteristic is the amount of sand accumulated in the sand separator 130. In other embodiments of the step 215, the first sensor is the temperature sensor 146*b* and the first characteristic is the amount of sand accumulated in the sand separator 130. In still other embodiments of the step 215, the first sensor is the pressure sensor 146*c* and the first characteristic is the pressure in the sand separator 130. At a step 220, the one or more computers (e.g., the control unit 170) controls, based on the measured first characteristic: the automated choke 120 to feed the wellbore slurry into the sand separator 130; and/or the automated choke 180 to dump the accumulated sand into the sand pit 140. At a step 225, the dumped sand is accumulated in the sand pit 140. At a step 230, a second characteristic of the sand accumulated in the sand pit 140 is measured using a second sensor. In some embodiments of the step 230, the second sensor is the level sensor 166*a* and the second characteristic is the amount of sand accumulated in the sand pit 140. In other embodiments of the step 230, the second sensor is the weight sensor 166*b* and the second characteristic is the weight of the sand accumulated in the sand pit 140. Finally, at a step 235, the measured first and second characteristics are compared using the one or more computers to verify the accuracy of the first characteristic as measured by the first sensor. In some embodiments, at the step 235, the measured first and second characteristics are compared using the one or more computers to verify the accuracy of the first characteristic as measured by the first sensor, as well as the accuracy of the second characteristic as measured by the second sensor. In some embodiments, at the step 235, the measured first and second characteristics are compared using the one or more computers to verify the accuracy of the first characteristic as measured by the first sensor, the accuracy of the second characteristic as measured by the second sensor, the overall operation of the system 100, or any combination thereof.

Referring to FIGS. 4A-4D, in an embodiment, the sand separation system 100 further includes a sand detection system 240 including energy generators 245*a-c* and energy sensors 250*a-c* retrofitted or otherwise mounted to the sand separator 130. In some embodiments, the sand separator 130 is a known type of sand separator to which the energy generators 245*a-c* and the energy sensors 250*a-c* are retrofitted. In one or more embodiments, the known type of the sand separator may be or include, for example: a known configuration (e.g., spherical, vertical, etc.); a known separation technique (e.g., cyclonic); a brand (e.g., Cameron®); a known size; a known working pressure or pressure rating; a known working pressure range; or any combination thereof. For example, the known type of sand separator may be a Cameron® vertical sand separator having a known size and known working pressure. For another example, the known type of sand separator may be a cyclonic sand separator. For yet another example, the known type of sand separator may be a cyclonic sand separator having a known size. The sand separator 130 defines an internal region 252 in which separated sand 254 is adapted to be disposed. In some embodiments, the energy generators 245*a-c* and the energy sensors 250*a-c* are mounted to the sand separator 130 outside of the internal region 252. In some embodiments, the energy generators 245*a-c* and the energy sensors 250*a-c* are non-invasively mounted to the sand separator 130. In addition to the energy generators 245*a-c* and the energy sensors 250*a-c,* the sand detection system 240 includes the one or more computers (e.g., the control unit 170).

The energy generators 245*a-c* are configured to impart energy to the sand separator 130 before, during, and/or after the sand separator 130 separates the wellbore slurry into the fluids stream 155 and the sand stream 160. For example, the energy generators 245*a-c* may be strikers configured to strike the sand separator 130, thereby imparting vibration to the sand separator 130. In at least one such embodiment, the energy generators 245*a-c* are solenoids. For example, the energy generators 245*a-c* may be sealed linear solenoids, intermittent, push, 1" Stroke, 68 oz. force, available from McMASTER-CARR®, Part No. 69905K179. In addition, or instead, the energy generators 245*a-c* may be emitters configured to emit electromagnetic or pressure (e.g., acoustic) waves into the sand separator 130. In some embodiments, as in FIGS. 4A-4D, the one or more computers (e.g., the control unit 170) is/are further adapted to communicate with the energy generators 245ac. For example, the one or more computers may send control signals to the energy generators 245a-c and/or receive data from the energy generators 245ac.

Figure 4A:
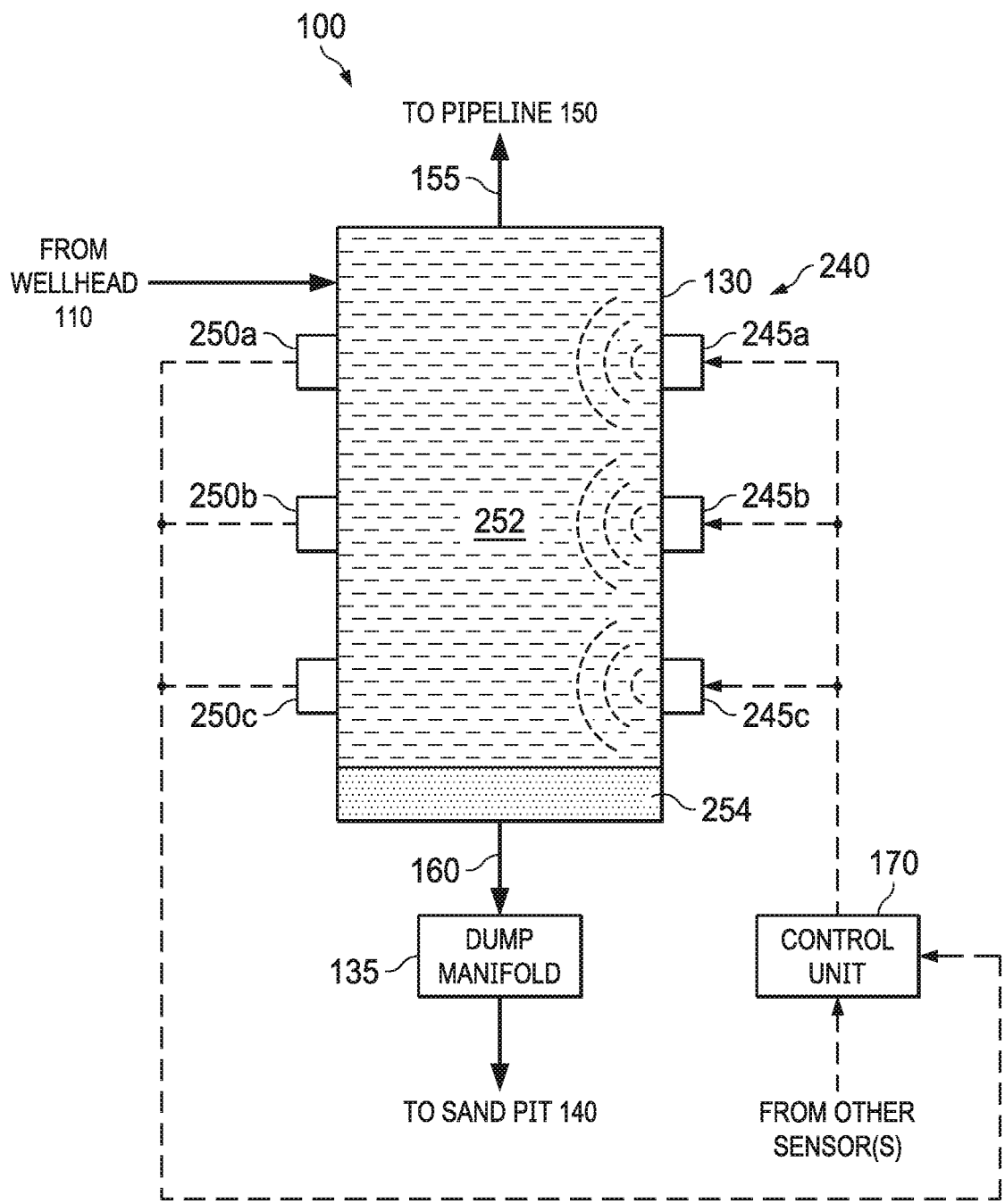
FIG. 4A is a diagrammatic illustration of another sand separation system including a sand separator having a first level of separated sand disposed therein, energy generators mounted to the sand separator, and energy sensors to the sand separator, according to one or more embodiments of the present disclosure.
Figure 4B:
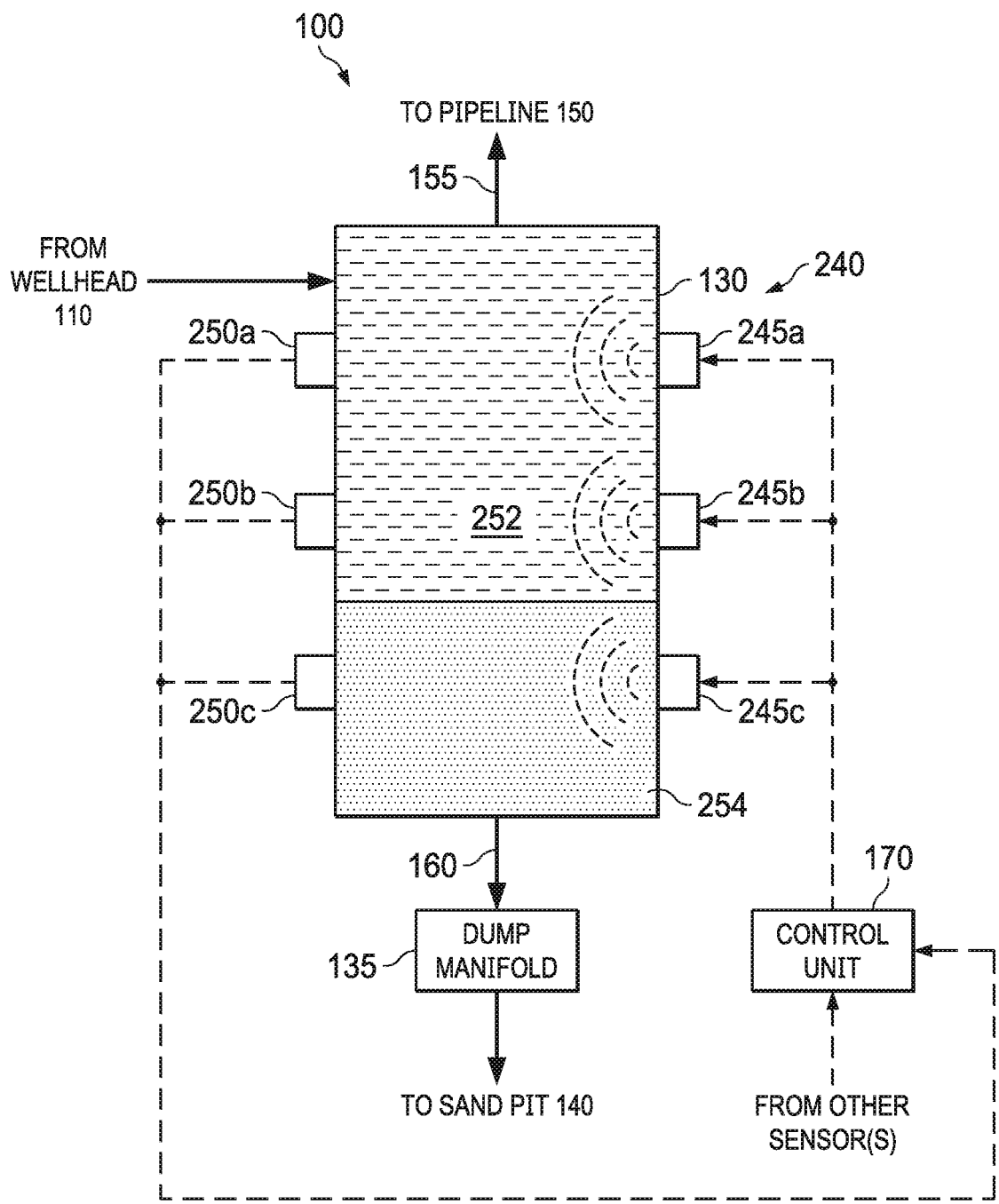
FIG. 4B is a diagrammatic illustration of the sand separation system of FIG. 4A in which the sand separator has a second level of separated sand disposed therein, according to one or more embodiments of the present disclosure.
Figure 4C:
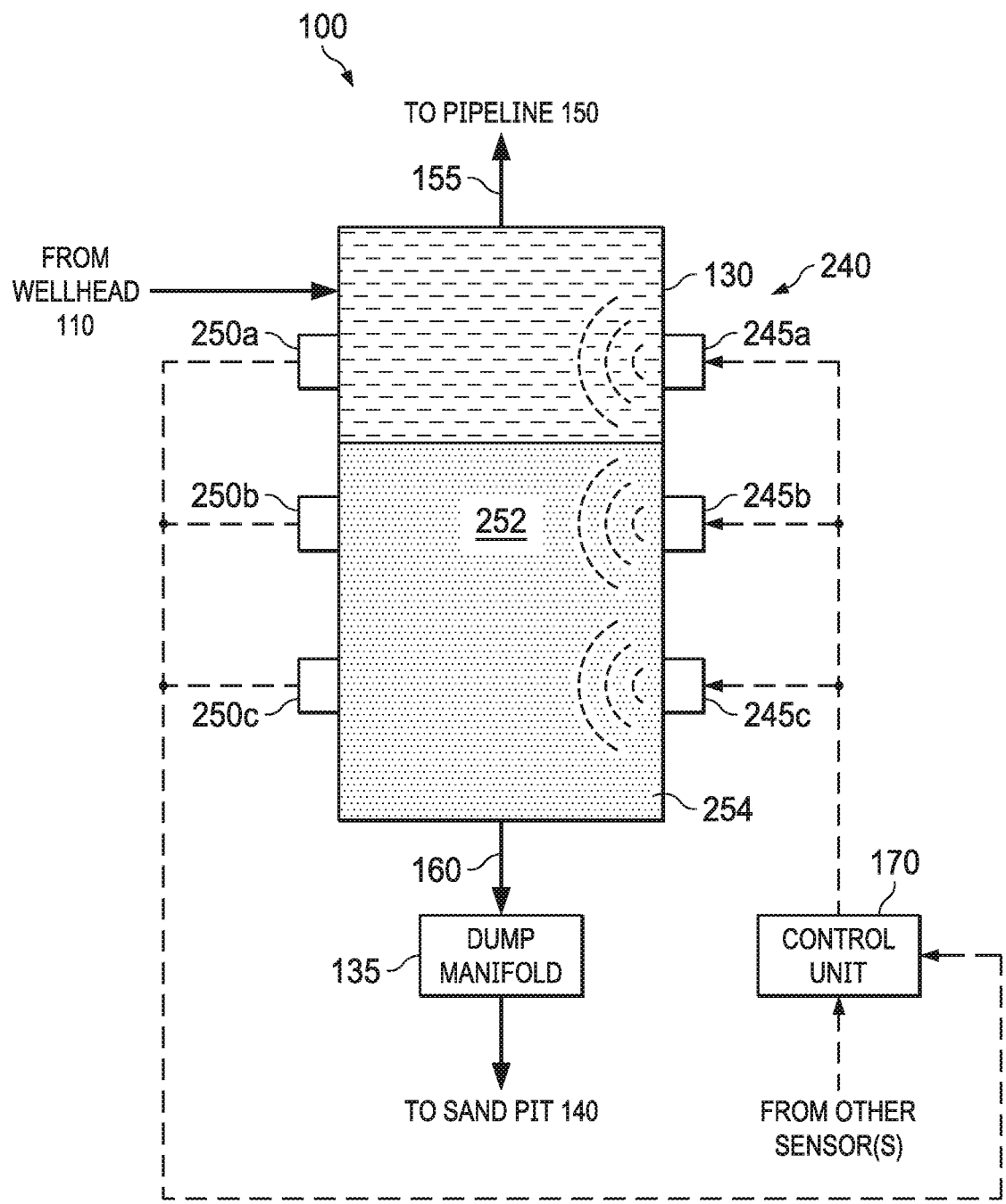
FIG. 4C is a diagrammatic illustration of the sand separation system of FIG. 4A in which the sand separator has a third level of separated sand disposed therein, according to one or more embodiments of the present disclosure.
Figure 4D:
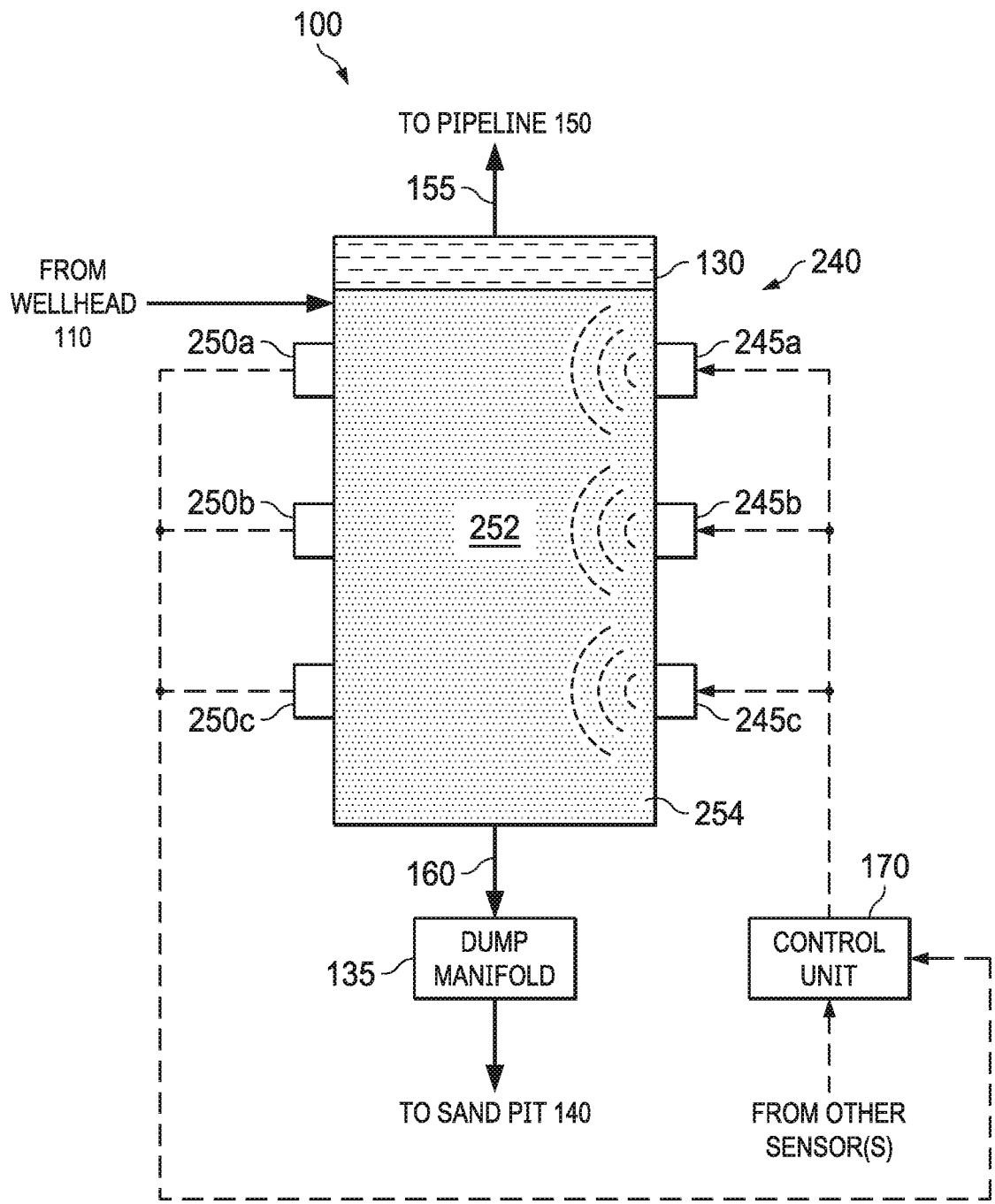
FIG. 4D is a diagrammatic illustration of the sand separation system of FIG. 4A in which the sand separator has a fourth level of separated sand disposed therein, according to one or more embodiments of the present disclosure.

The energy generators 245a-c are spaced vertically along the height of the sand separator 130. One or more of the energy generators 245a-c may be circumferentially aligned with one or more of the other energy generators 245a-c along the circumference of the sand separator 130, as shown in FIGS. 4A-4C. In addition, or instead, one or more of the energy generators 245a-c may be circumferentially offset from one or more of the other energy generators 245a-c along the circumference of the sand separator 130. Finally, although shown in FIGS. 4A-4D with the three (3) energy generators 245ac, the sand detection system 240 may instead include one (1), two (2), four (4) or more energy generators.

The energy sensors 250a-c are configured to detect a response to the energy imparted to the sand separator 130 by the energy generators 245a-c before, during, and/or after the sand separator 130 separates the wellbore slurry into the fluids stream 155 and the sand stream 160. For example, the energy sensors 250a-c may be configured to detect vibration imparted to the sand separator 130 by the energy generators 245a-c (i.e., the strikers). In some embodiments, the energy sensors 250a-c are accelerometers. In some embodiments, the energy sensors 250a-c are triaxial accelerometers. For example, the energy sensors 250a-c may be triaxial ICP® accelerometers having 100 mV/g sensitivity and ¼-28 4-pin electrical connectors, available from The Modal Shop, PCB Piezotronics Model No. TLD356A14, Type SU, TEDS Version. Furthermore, in one embodiment the energy sensors 250a-c may be wired using 4-conductor shielded cables having a 4-pin plug to (3) BNC plugs, available from The Modal Shop, PCB Piezotronics Model No. 010G50, Type SU. In addition, or instead, the energy sensors 250a-c may be configured to detect electromagnetic or pressure (e.g., acoustic) waves emitted into the sand separator 130 by the energy generators 245a-c (or another source). In some embodiments, as in FIGS. 4A-4D, the one or more computers (e.g., the control unit 170) is/are further adapted to receive data/signals from the energy sensors 250a-c.

The energy sensors 250a-c are spaced vertically along the height of the sand separator 130. One or more of the energy sensors 250a-c may be circumferentially aligned with one or more of the other energy sensors 250a-c along the circumference of the sand separator 130, as shown in FIGS. 4A-4C. In addition, or instead, one or more of the energy sensors 250a-c may be circumferentially offset from one or more of the other energy sensors 250a-c along the circumference of the sand separator 130. Likewise, one or more of the energy sensors 250a-c may be circumferentially offset from one or more of the energy generators 245a-c (e.g., by 180-degrees) along the circumference of the sand separator 130, as shown in FIGS. 4A-4D. In addition, or instead, one or more of the energy sensors 250a-c may be circumferentially aligned with one or more of the energy generators 245a-c along the circumference of the sand separator 130. Finally, although shown in FIGS. 4A-4D with the three (3) energy sensors 250ac, the sand detection system 240 may instead include one (1), two (2), four (4), or more energy sensors.

Referring to FIG. 5, with continuing reference to FIGS. 4A-4D, in an embodiment, a method is generally referred to by the reference numeral 255. The method 255 includes at a step 260, determining, independently of the sand detection system 240, a first level of separated sand within the sand separator 130. For example, the first level of separated sand within the sand separator 130 may be determined based on data/signals received from the ultrasonic sensor 146a, the temperature sensor 146b, the pressure sensor 146c, the sand sensor 156a, the sand sensor 156b, the level sensor 166a, the weight sensor 166b, the pressure sensor 176a, the pressure sensor 176b, the pressure sensor 196, the another level sensor located internally within the sand separator 130, or any combination thereof. For another example, the first level of separated sand within the sand separator 130 may be determined based on visual and/or physical inspection of the sand separator 130. At a step 265, first energy is imparted to the sand separator 130 using one or more of the energy generators 245ac. At a step 270, when the first level of separated sand is disposed within the sand separator 130, a first response to the first energy imparted to the sand separator 130 is detected using one or more of the energy sensors 250a-c.

For example, the first level of separated sand within the sand separator 130 may be the level of separated sand shown in FIG. 4A. For another example, the first level of separated sand within the sand separator 130 may be the level of separated sand shown in FIG. 4B. For yet another example, the first level of separated sand within the sand separator 130 may be the level of separated sand shown in FIG. 4C. For yet another example, the first level of separated sand within the sand separator 130 may be the level of separated sand shown in FIG. 4D.

At a step 275, a second level of separated sand within the sand separator 130 is determined independently of the sand detection system 240. For example, the second level of separated sand within the sand separator 130 may be determined from data/signals received from the ultrasonic sensor 146a, the temperature sensor 146b, the pressure sensor 146c, the sand sensor 156a, the sand sensor 156b, the level sensor 166a, the weight sensor 166b, the pressure sensor 176a, the pressure sensor 176b, the pressure sensor 196, the another level sensor located internally within the sand separator 130, or any combination thereof. For another example, the second level of separated sand within the sand separator 130 may be determined via visual and/or physical inspection of the sand separator 130. At a step 280, second energy is imparted to the sand separator 130 using one or more of the energy generators 245ac. At a step 285, when the second level of separated sand is disposed within the sand separator 130, a second response to the second energy imparted to the sand separator 130 is detected using one or more of the energy sensors 250a-c.

The second level of separated sand within the sand separator 130 is different than the first level of separated sand within the sand separator 130. For example, the second level of separated sand within the sand separator 130 may be the level of separated sand shown in FIG. 4A. For another example, the second level of separated sand within the sand separator 130 may be the level of separated sand shown in FIG. 4B. For yet another example, the second level of separated sand within the sand separator 130 may be the level of separated sand shown in FIG. 4C. For yet another example, the second level of separated sand within the sand separator 130 may be the level of separated sand shown in FIG. 4D.

At a step 290, the sand detection system 240 is tuned based on the independently determined first level, the first response detected by the energy sensor(s) 250ac, the independently determined second level, and the second response detected by the energy sensor(s) 250*ac*. At a step 295, third energy is imparted to the sand separator 130 using one or more of the energy generators 245*ac*. At a step 300, when the sand separator 130 is filled with a third level of separated sand, a third response to the third energy imparted to the sand separator 130 is detected using one or more of the energy sensors 250*ac*.

The third level of separated sand within the sand separator 130 is different than the first level of separated sand within the sand separator 130 and the second level of separated sand within the sand separator 130. For example, the third level of separated sand within the sand separator 130 may be the level of separated sand shown in FIG. 4A. For another example, the third level of separated sand within the sand separator 130 may be the level of separated sand shown in FIG. 4B. For yet another example, the third level of separated sand within the sand separator 130 may be the level of separated sand shown in FIG. 4C. For yet another example, the third level of separated sand within the sand separator 130 may be the level of separated sand shown in FIG. 4D.

At a step 305, the third level of separated sand in the sand separator 130 is determined, using the sand detection system 240, based on the tuning of the sand detection system 240 and the third response detected by the energy sensor(s) 250*ac*. Finally, at a step 310, at least a portion of the separated sand is dumped from the sand separator 130 based on the determined third ratio.

Figure 6A:
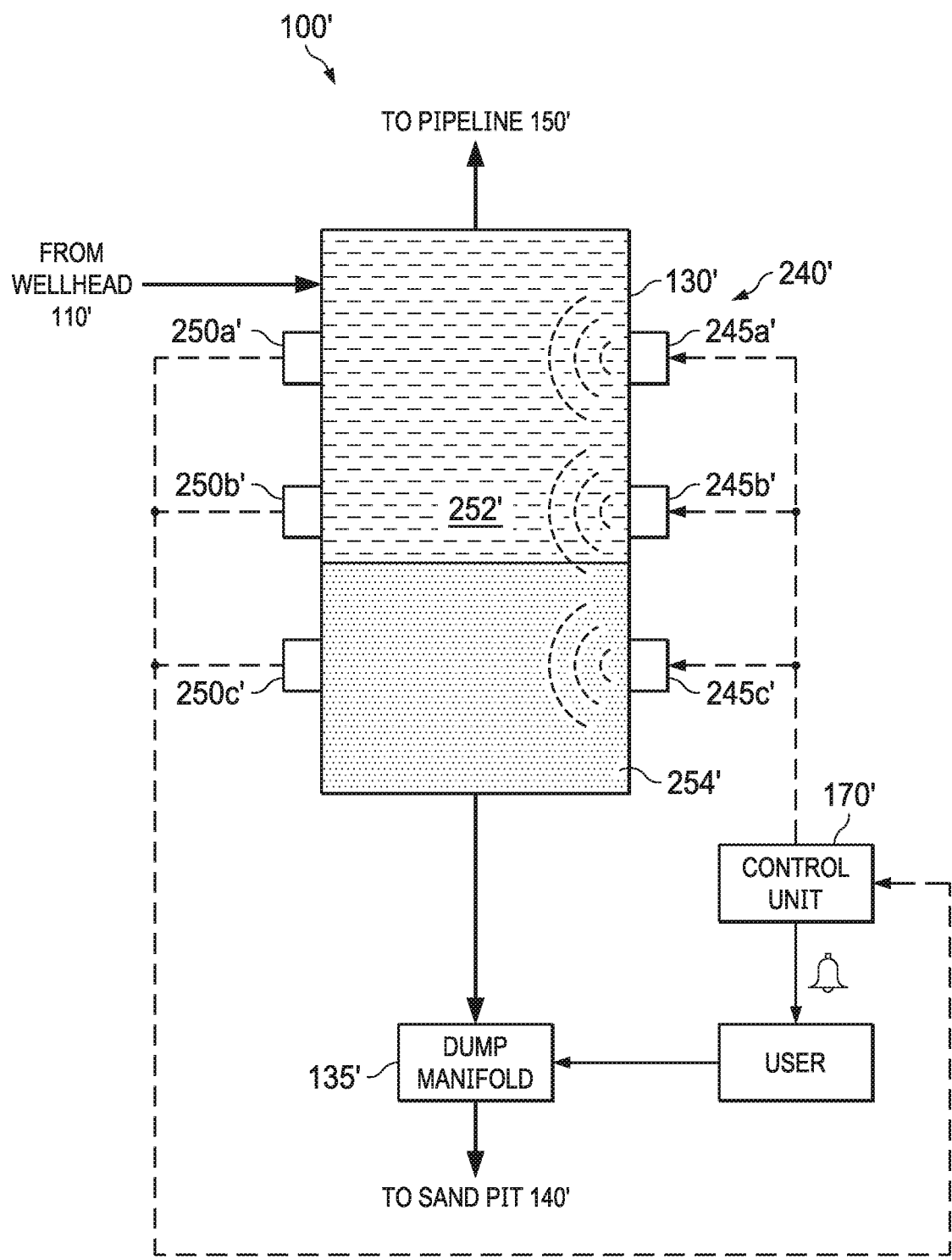
FIG. 6A is a diagrammatic illustration of another sand separation system, according to an embodiment in which a user manually actuates a dump manifold based on an "alarm" signal received from a control unit, according to one or more embodiments of the present disclosure.
Figure 6B:
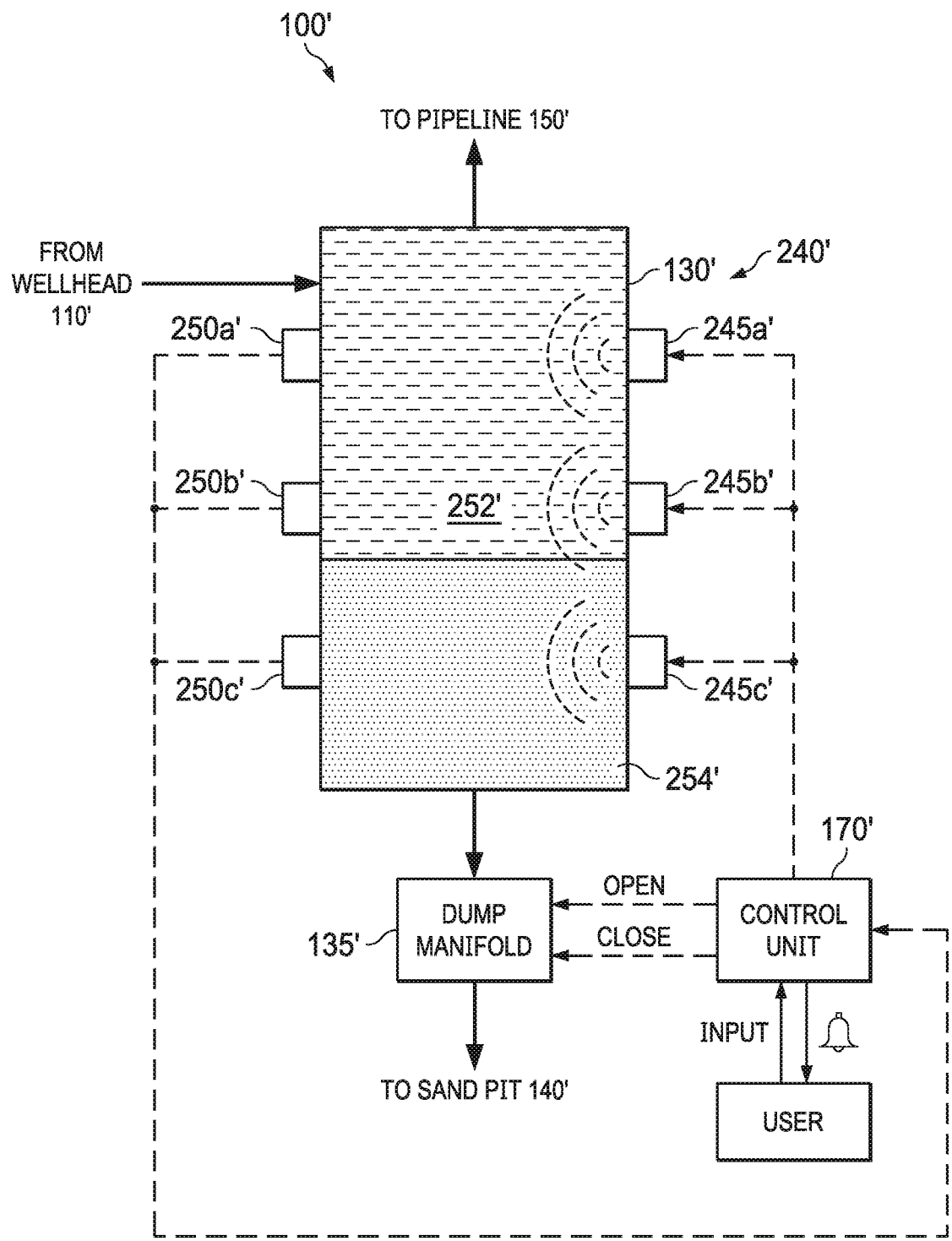
FIG. 6B is a diagrammatic illustration of the another sand separation system of FIG. 6A, according to another embodiment in which the control unit actuates the dump manifold based on an input received from the user, according to one or more embodiments of the present disclosure.
Figure 6C:
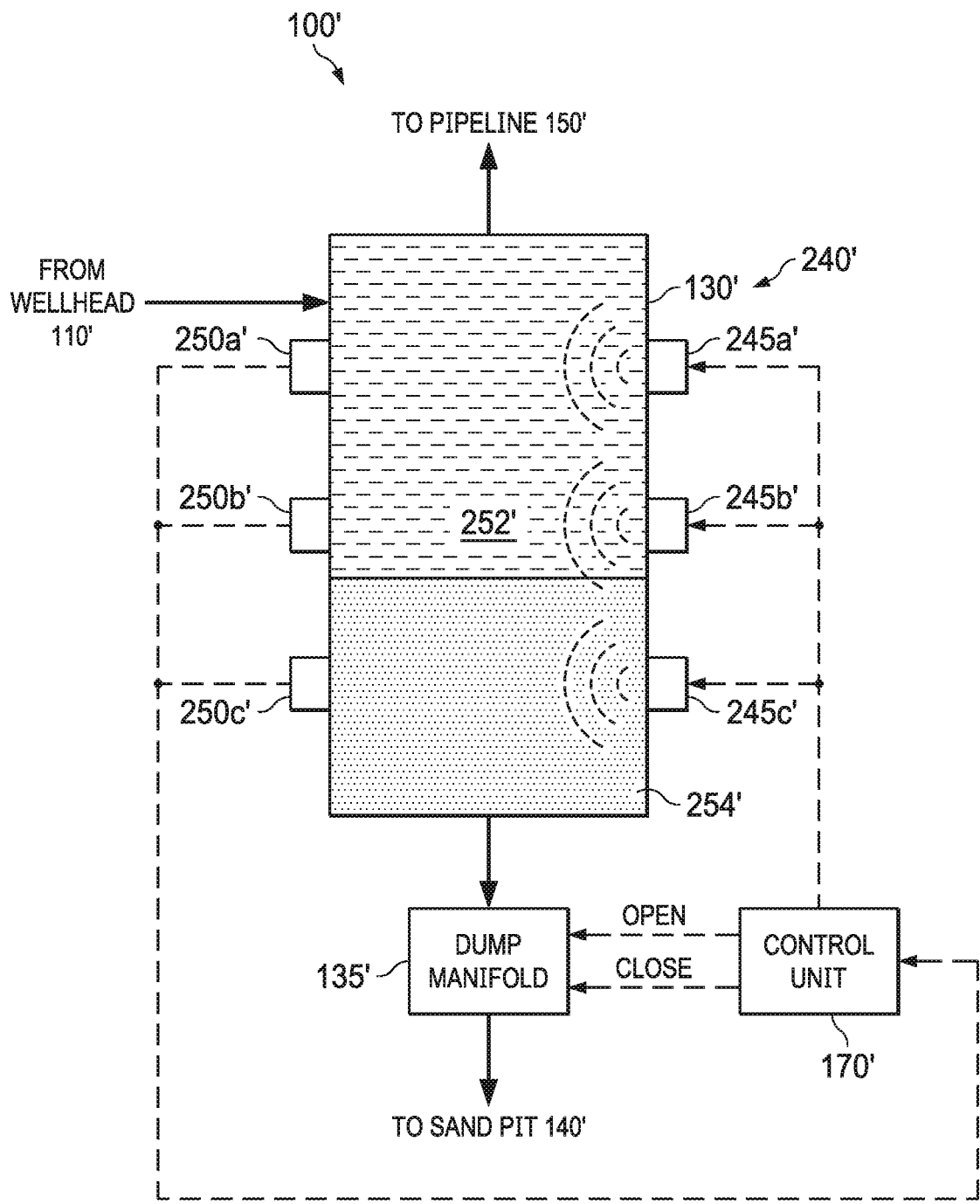
FIG. 6C is a diagrammatic illustration of the another sand separation system of FIG. 6A, according to yet another embodiment in which the control unit actuates the dump manifold automatically based on data/signals received from energy sensors, according to one or more embodiments of the present disclosure.

Referring to FIGS. 6A-6C, in an embodiment, a sand separation system is generally referred to by the reference numeral 100' and includes several features and/or components substantially identical to corresponding features and/or components of the sand separation system 100, which substantially identical features and/or components are given the same reference numerals, except that the suffix "'" is added. Accordingly, the sand separation system 100' includes a sand separator 130' (e.g., of a known type). The sand separator 130' defines an internal region 252' in which separated sand 254' is adapted to be disposed. Energy generators 245*a*'-245*c*' are adapted to impart energy to the sand separator 130'. In some embodiments, the energy generators 245*a*'-245*c*' are mounted to the sand separator 130' outside of the internal region 252'. In some embodiments, the energy generators 245*a*'-245*c*' are non-invasively mounted to the sand separator 130'. In some embodiments, the energy generators 245*a*'-245*c*' comprise strikers and the energy imparted to the sand separator 130' comprises one or more impacts administered against the sand separator 130' by the strikers. Energy sensors 250*a*'-250*c*' are adapted to detect a response to the energy imparted to the sand separator 130' by the energy generators 245*a*'-245*c*'. In some embodiments, the energy sensors 250*a*'-250*c*' are mounted to the sand separator 130' outside of the internal region 252'. In some embodiments, the energy sensors 250*a*'-250*c*' are non-invasively mounted to the sand separator 130'. In some embodiments, the response detected by the energy sensors 250*a*'-250*c*' comprises a vibrational response caused by the one or more impacts administered against the sand separator 130' by the strikers. One or more computers (e.g., a control unit 170') is/are adapted to communicate with the energy sensors 250*a*'-250*c*' and the energy generators 245*a*'-245*c*', the one or more computers being configured to determine an unknown sand level in the sand separator 130'.

In one or more embodiments, the energy generators 245*a*'-245*c*', the energy sensors 250*a*'-250*c*', and the one or more computers (e.g., the control unit 170'), or any combination thereof, are "pre-tuned" based on: known sand level(s) in: the sand separator 130', and/or another sand separator (e.g., the sand separator 130); and detected response(s) to energy imparted to: the sand separator 130' when the sand separator 130' is filled with the known sand level(s), and/or the another sand separator (e.g., the sand separator 130) when the another sand separator is filled with the known sand level(s). For example, in one or more embodiments, the pre-tuning of the energy generators 245*a*'-245*c*', the energy sensors 250*a*'-250*c*', the one or more computers, or the any combination thereof, may be based at least partially on the execution of the method 255. More particularly, such pre-tuning may be based on the first sand level independently determined at the step 260 of the method 255, the first response detected by the energy sensor(s) 250*a-c* at the step 270 of the method 255, the second sand level independently determined at the step 275 of the method 255, and the second response detected by the energy sensor(s) 250*a-c* at the step 285 of the method 255. Finally, the one or more computers (e.g., the control unit 170') are configured to determine the unknown sand level in the sand separator 130' based on: the response detected by the one or more energy sensors 250*a*'-250*c*'; and the pre-tuning of the one or more computers, the one or more energy sensors 250*a*'-250*c*', the one or more energy generators 245*a*'-245*b*', or the any combination thereof.

Figure 7:
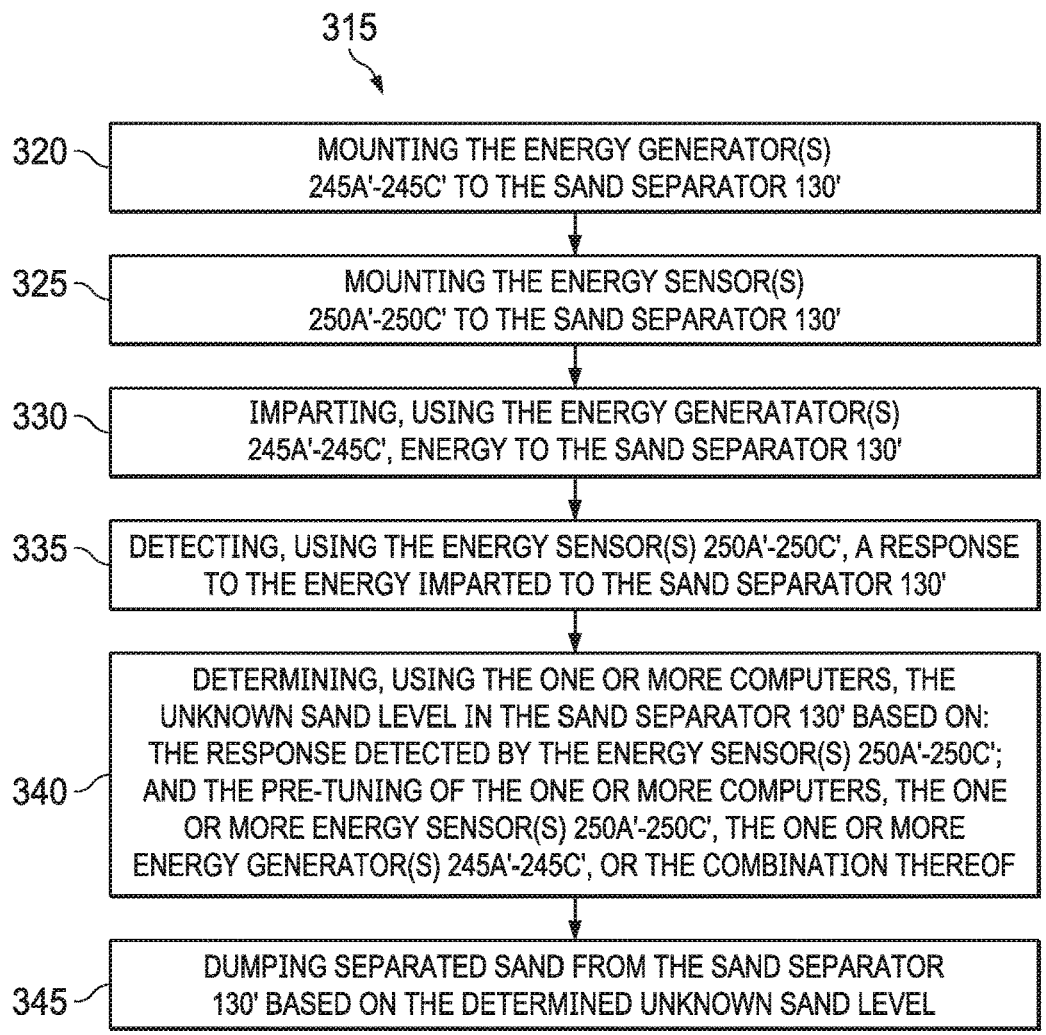
FIG. 7 is a flow diagram of yet another method for implementing one or more embodiments of the present disclosure.

Referring to FIG. 7, with continuing reference to FIGS. 6A-6C, in an embodiment, a method for the sand separation system 100' is generally referred to by the reference numeral 315. The method 315 generally includes at a step 320 mounting the energy generator(s) 245*a*'-245*c*' to the sand separator 130'. For example, the energy generator(s) 245*a*'-245*c*' may be mounted to the sand separator 130' outside of the internal region 252'. For another example, the energy generator(s) 245*a*'-245*c*' may be non-invasively mounted to the sand separator 130'. At a step 325, the energy sensor(s) are mounted to the sand separator 130'. For example, the energy sensor(s) may be mounted to the sand separator 130' outside of the internal region 252'. For another example, the energy sensor(s) may be non-invasively mounted to the sand separator 130'. At a step 330, using the energy generator(s) 245*a*'-245*c*', energy is imparted to the sand separator 130'. More particularly, the one or more computers (e.g., the control unit 170') communicate(s) control signals to the energy generator(s) 245*a*'-245*c*' to cause the energy generator(s) 245*a*'-245*c*' to impart the energy to the sand separator 130'. For example, the energy imparted to the sand separator 130' by the energy generator(s) 245*a*'-245*c*' may include one or more impacts administered against the sand separator 130'. At a step 335, using the energy sensor(s), a response to the energy imparted to the sand separator 130' is detected. More particularly, the one or more computers receive data/signals from the energy sensor(s) 250*a*'-250*c*' based on the response to the energy imparted to the sand separator 130' when the sand separator 130' is filled with an unknown level of separated sand. For example, the response detected by the energy sensor(s) may include a vibrational response caused by the one or more impacts administered against the sand separator 130'. At a step 340, using the one or more computers, the unknown sand level in the sand separator 130' is determined based on: the response detected by the energy sensor(s); and the pre-tuning of the one or more computers, the one or more energy sensor(s), the one or more energy generator(s) 245*a*'-245*c*', or the any combination thereof.

Finally, at a step 345, separated sand is dumped from the sand separator 130' based on the determined unknown sand level. More particularly, in some embodiments, as in FIG. 6A, the one or more computers (e.g., the control unit 170')

facilitate(s) the dumping of the at least a portion of the separated sand from the sand separator 130' by communicating an "alarm" signal to a user when the level of separated sand in the sand separator 130' exceeds a predetermined threshold. The user then causes the dumping of the at least a portion of the separated sand from the sand separator 130' by actuating (e.g., manually) the dump manifold 135' to effectuate a dumping cycle. In other embodiments, as in FIG. 6B, the one or more computers facilitate(s) the dumping of the at least a portion of the separated sand from the sand separator 130' by communicating an "alarm" signal to a user when the level of separated sand in the sand separator 130' exceeds a predetermined threshold. The user then communicates an "input" back to the one or more computers (e.g., "approve dump") and, based on the user's input, the one or more computers cause(s) the dumping of the at least a portion of the separated sand from the sand separator 130' by communicating "open" and "close" control signals to the dump manifold 135' to effectuate a dumping cycle. In still other embodiments, as in FIG. 6C, based on the data/signals received from the energy sensors 250*a*'-250*c*' without any user input, the one or more computers cause(s) the dumping of the at least a portion of the separated sand from the sand separator 130' by automatically communicating "open" and "close" control signals to the dump manifold 135' to effectuate a dumping cycle.

Figure 8:
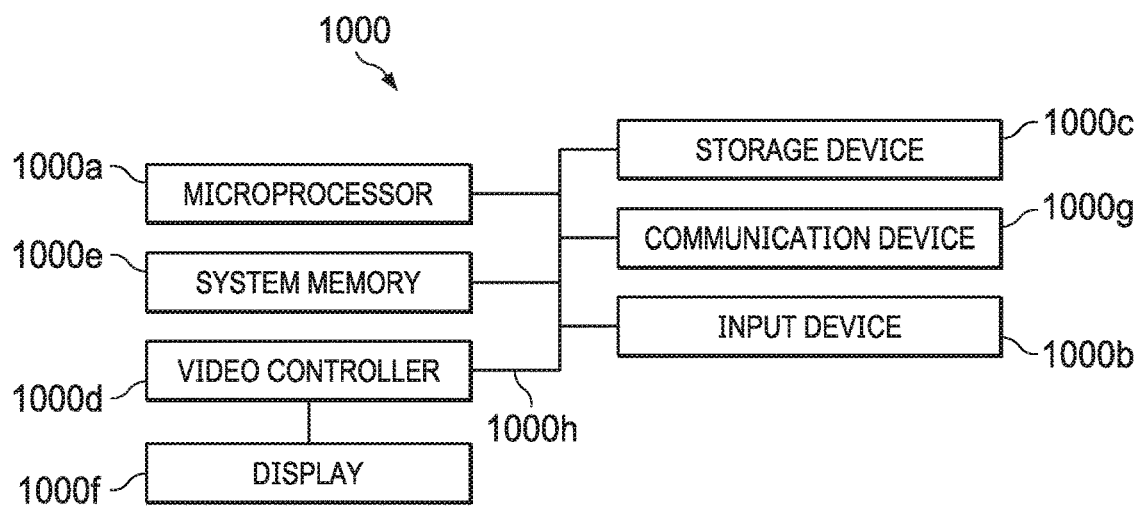
FIG. 8 is a diagrammatic illustration of a computing node for implementing one or more embodiments of the present disclosure.

Referring to FIG. 8, in an embodiment, a computing node 1000 for implementing one or more embodiments of one or more of the above-described elements, computers, control units (e.g., 170 and/or 170'), systems (e.g., 100 and/or 100'), methods (e.g., 200 and/or 315) and/or steps (e.g., 205, 210, 215, 220, 225, 230, 235, 320, 325, 330, 335, 340, and/or 345), or any combination thereof, is depicted. More particularly, in several embodiments, the node 1000 is, includes, or is part of the control unit 170 (or the control unit 170') so as to provide for autonomous or stand-alone operation of the system 100 (or the system 100') and/or execution of the method 200 (or the method 315). The node 1000 includes a microprocessor 1000*a*, an input device 1000*b*, a storage device 1000*c*, a video controller 1000*d*, a system memory 1000*e*, a display 1000*f*, and a communication device 1000*g* all interconnected by one or more buses 1000*h*. In several embodiments, the storage device 1000*c* may include a floppy drive, hard drive, CD-ROM, optical drive, any other form of storage device or any combination thereof. In several embodiments, the storage device 1000*c* may include, and/or be capable of receiving, a floppy disk, CD-ROM, DVD-ROM, or any other form of computer-readable medium that may contain executable instructions. In several embodiments, the communication device 1000*g* may include a modem, network card, or any other device to enable the node 1000 to communicate with other nodes. In several embodiments, any node represents a plurality of interconnected (whether by intranet or Internet) computer systems, including without limitation, personal computers, mainframes, PDAs, smartphones and cell phones.

In several embodiments, one or more of the components of any of the above-described systems include at least the node 1000 and/or components thereof, and/or one or more nodes that are substantially similar to the node 1000 and/or components thereof. In several embodiments, one or more of the above-described components of the node 1000 and/or the above-described systems include respective pluralities of same components.

In several embodiments, a computer system typically includes at least hardware capable of executing machine readable instructions, as well as the software for executing acts (typically machine-readable instructions) that produce a desired result. In several embodiments, a computer system may include hybrids of hardware and software, as well as computer sub-systems.

In several embodiments, hardware generally includes at least processor-capable platforms, such as client-machines (also known as personal computers or servers), and handheld processing devices (such as smart phones, tablet computers, personal digital assistants (PDAs), or personal computing devices (PCDs), for example). In several embodiments, hardware may include any physical device that is capable of storing machine-readable instructions, such as memory or other data storage devices. In several embodiments, other forms of hardware include hardware sub-systems, including transfer devices such as modems, modem cards, ports, and port cards, for example.

In several embodiments, software includes any machine code stored in any memory medium, such as RAM or ROM, and machine code stored on other devices (such as floppy disks, flash memory, or a CD ROM, for example). In several embodiments, software may include source or object code. In several embodiments, software encompasses any set of instructions capable of being executed on a node such as, for example, on a client machine or server.

In several embodiments, combinations of software and hardware could also be used for providing enhanced functionality and performance for certain embodiments of the present disclosure. In an embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several embodiments, computer readable mediums include, for example, passive data storage, such as a random access memory (RAM) as well as semi-permanent data storage such as a compact disk read only memory (CD-ROM). One or more embodiments of the present disclosure may be embodied in the RAM of a computer to transform a standard computer into a new specific computing machine. In several embodiments, data structures are defined organizations of data that may enable an embodiment of the present disclosure. In an embodiment, a data structure may provide an organization of data, or an organization of executable code.

In several embodiments, any networks and/or one or more portions thereof, may be designed to work on any specific architecture. In an embodiment, one or more portions of any networks may be executed on a single computer, local area networks, client-server networks, wide area networks, internets, hand-held and other portable and wireless devices and networks.

In several embodiments, a database may be any standard or proprietary database software. In several embodiments, the database may have fields, records, data, and other database elements that may be associated through database specific software. In several embodiments, data may be mapped. In several embodiments, mapping is the process of associating one data entry with another data entry. In an embodiment, the data contained in the location of a character file can be mapped to a field in a second table. In several embodiments, the physical location of the database is not limiting, and the database may be distributed. In an embodiment, the database may exist remotely from the server, and run on a separate platform. In an embodiment, the database may be accessible across the Internet. In several embodiments, more than one database may be implemented.

In several embodiments, a plurality of instructions stored on a non-transitory computer readable medium may be executed by one or more processors to cause the one or more processors to carry out or implement in whole or in part the above-described operation of each of the above-described elements, computers, control units (e.g., 170 and/or 170'), systems (e.g., 100 and/or 100'), methods (e.g., 200 and/or 315) and/or steps (e.g., 205, 210, 215, 220, 225, 230, 235, 320, 325, 330, 335, 340, and/or 345), or any combination thereof. In several embodiments, such a processor may include one or more of the microprocessor 1000a, any processor(s) that are part of the components of the above-described systems, and/or any combination thereof, and such a computer readable medium may be distributed among one or more components of the above-described systems. In several embodiments, such a processor may execute the plurality of instructions in connection with a virtual computer system. In several embodiments, such a plurality of instructions may communicate directly with the one or more processors, and/or may interact with one or more operating systems, middleware, firmware, other applications, and/or any combination thereof, to cause the one or more processors to execute the instructions.

A sand separation system has been disclosed. The sand separation system generally includes a sand separator of a known type, wherein the sand separator of the known type defines an internal region in which separated sand is adapted to be disposed; one or more energy generators adapted to impart energy to the sand separator of the known type, wherein the one or more energy generators are mounted to the sand separator of the known type outside of the internal region, wherein the one or more energy generators include one or more strikers, and wherein the energy imparted to the sand separator of the known type includes one or more impacts administered against the sand separator of the known type by the one or more strikers; one or more energy sensors adapted to detect a response to the energy imparted to the sand separator of the known type, wherein the one or more energy sensors are mounted to the sand separator of the known type outside of the internal region, and wherein the response detected by the one or more energy sensors includes a vibrational response caused by the one or more impacts administered against the sand separator of the known type by the one or more strikers; and one or more computers adapted to communicate with the one or more energy sensors and the one or more energy generators, the one or more computers being configured to determine an unknown sand level in the sand separator of the known type; wherein the one or more computers, the one or more energy sensors, the one or more energy generators, or any combination thereof are pre-tuned based on: known sand level(s) in: the sand separator of the known type, and/or another sand separator of the known type, and detected response(s) to energy imparted to: the sand separator of the known type when the sand separator of the known type is filled with the known sand level(s), and/or the another sand separator of the known type when the another sand separator of the known type is filled with the known sand level(s); and wherein the one or more computers are configured to determine the unknown sand level in the sand separator of the known type based on: the response detected by the one or more energy sensors, and the pre-tuning of the one or more computers, the one or more energy sensors, the one or more energy generators, or the any combination thereof. In one or more embodiments, the one or more energy sensors are non-invasively mounted to the sand separator of the known type; and the one or more energy generators are non-invasively mounted to the sand separator of the known type. In one or more embodiments, the one or more computers, the one or more energy sensors, the one or more energy generators, or the any combination thereof are pre-tuned based on: the known sand level(s) in the sand separator of the known type; and the detected response(s) to the energy imparted to the sand separator of the known type when the sand separator of the known type is filled with the known sand level(s). In one or more embodiments, the one or more computers, the one or more energy sensors, the one or more energy generators, or the any combination thereof are pre-tuned based on: the known sand level(s) in the another sand separator of the known type; and the detected response(s) to the energy imparted to the another sand separator of the known type when the another sand separator of the known type is filled with the known sand level(s).

A method for a sand separation system has also been disclosed. The method generally includes mounting one or more energy generators to a sand separator of a known type, wherein the sand separator of the known type defines an internal region in which separated sand is adapted to be disposed, and wherein mounting the one or more energy generators to the sand separator of the known type includes mounting the one or more energy generators to the sand separator of the known type outside of the internal region; mounting one or more energy sensors to the sand separator of the known type outside of the internal region; imparting, using the one or more energy generators, energy to the sand separator of the known type, wherein imparting the energy to the sand separator of the known type includes administering one or more impacts against the sand separator of the known type; detecting, using the one or more energy sensors, a response to the energy imparted to the sand separator of the known type, wherein the response detected by the one or more energy sensors includes a vibrational response caused by the one or more impacts administered against the sand separator of the known type by the one or more strikers; and determining, using one or more computers, an unknown sand level in the sand separator of the known type, the one or more computers being adapted to communicate with the one or more energy sensors and the one or more energy generators; wherein the one or more computers, the one or more energy sensors, the one or more energy generators, or any combination thereof are pre-tuned based on: known sand level(s) in: the sand separator of the known type, and/or another sand separator of the known type, and detected response(s) to energy imparted to: the sand separator of the known type when the sand separator of the known type is filled with the known sand level(s), and/or the another sand separator of the known type when the another sand separator of the known type is filled with the known sand level(s); and wherein the one or more computers determine the unknown sand level in the sand separator of the known type based on: the response detected by the one or more energy sensors, and the pre-tuning of the one or more computers, the one or more energy sensors, the one or more energy generators, or the any combination thereof. In one or more embodiments, mounting the one or more energy generators to the sand separator of the known type outside of the internal region includes non-invasively mounting the one or more energy generators to the sand separator of the known type; and mounting the one or more energy sensors to the sand separator of the known type outside of the internal region includes non-invasively mounting the one or more energy sensors to the sand separator of the known type. In one or more embodiments, the one or more computers, the one or more energy sensors, the one or more energy generators, or the any combination thereof are pre-tuned based on: the known sand level(s) in the sand separator of the known type; and the detected response(s) to the energy imparted to the sand separator of the known type when the sand separator of the known type is filled with the known sand level(s). In one or more embodiments, the one or more computers, the one or more energy sensors, the one or more energy generators, or the any combination thereof are pre-tuned based on: the known sand level(s) in the another sand separator of the known type; and the detected response(s) to the energy imparted to the another sand separator of the known type when the another sand separator of the known type is filled with the known sand level(s).

A system for a sand separator of a known type has also been disclosed. The system generally includes one or more energy sensors adapted to detect a response to energy imparted to the sand separator of the known type; and one or more computers adapted to communicate with the one or more energy sensors, the one or more computers being configured to determine an unknown sand level in the sand separator of the known type; wherein the one or more computers and/or the one or more energy sensors are pre-tuned based on: known sand level(s) in: the sand separator of the known type, and/or another sand separator of the known type, and detected response(s) to energy imparted to: the sand separator of the known type when the sand separator of the known type is filled with the known sand level(s), and/or the another sand separator of the known type when the another sand separator of the known type is filled with the known sand level(s); and wherein the one or more computers are configured to determine the unknown sand level in the sand separator of the known type based on: the response detected by the one or more energy sensors, and the pre-tuning of the one or more energy sensors and/or the one or more computers. In one or more embodiments, the energy is imparted to the sand separator of the known type by one or more impacts administered against the sand separator of the known type; and the response includes a vibrational response caused by the one or more impacts administered against the sand separator of the known type. In one or more embodiments, the system further includes the sand separator of the known type; wherein the one or more energy sensors are non-invasively mounted to the sand separator of the known type. In one or more embodiments, the system further includes the sand separator of the known type; wherein the sand separator of the known type defines an internal region in which separated sand is adapted to be disposed; and wherein the one or more energy sensors are mounted to the sand separator of the known type outside of the internal region. In one or more embodiments, the system further includes: one or more energy generators adapted to impart the energy to the sand separator of the known type; wherein the one or more computers are further adapted to communicate with the one or more energy generators. In one or more embodiments, the one or more energy generators include one or more strikers; the energy imparted to the sand separator of the known type includes one or more impacts administered against the sand separator of the known type by the one or more strikers; and the response detected by the one or more energy sensors includes a vibrational response caused by the one or more impacts administered against the sand separator of the known type by the one or more strikers. In one or more embodiments, the system further includes the sand separator of the known type; wherein the one or more energy sensors are non-invasively mounted to the sand separator of the known type; and wherein the one or more energy generators are non-invasively mounted to the sand separator of the known type. In one or more embodiments, the system further includes the sand separator of the known type; wherein the sand separator of the known type defines an internal region in which separated sand is adapted to be disposed; wherein the one or more energy sensors are mounted to the sand separator of the known type outside of the internal region; and wherein the one or more energy generators are mounted to the sand separator of the known type outside of the internal region. In one or more embodiments, the one or more computers and/or the one or more energy sensors are pre-tuned based on: the known sand level(s) in the sand separator of the known type; and the detected response(s) to the energy imparted to the sand separator of the known type when the sand separator of the known type is filled with the known sand level(s). In one or more embodiments, the one or more computers and/or the one or more energy sensors are pre-tuned based on: the known sand level(s) in the another sand separator of the known type; and the detected response(s) to the energy imparted to the another sand separator of the known type when the another sand separator of the known type is filled with the known sand level(s).

A method for a sand separator of a known type has also been disclosed. The method generally includes detecting, using one or more energy sensors, a response to energy imparted to the sand separator of the known type; and determining, using one or more computers, an unknown sand level in the sand separator of the known type, the one or more computers being adapted to communicate with the one or more energy sensors; wherein the one or more computers and/or the one or more energy sensors are pre-tuned based on: known sand level(s) in: the sand separator of the known type, and/or another sand separator of the known type, and detected response(s) to energy imparted to: the sand separator of the known type when the sand separator of the known type is filled with the known sand level(s), and/or the another sand separator of the known type when the another sand separator of the known type is filled with the known sand level(s); and wherein the one or more computers determine the unknown sand level in the sand separator of the known type based on: the response detected by the one or more energy sensors, and the pre-tuning of the one or more energy sensors and/or the one or more computers. In one or more embodiments, the method further includes imparting the energy to the sand separator of the known type; wherein imparting the energy to the sand separator of the known type includes administering one or more impacts against the sand separator of the known type; and wherein detecting, using the one or more energy sensors, the response to the energy imparted to the sand separator of the known type includes detecting, using the one or more energy sensors, a vibrational response caused by the one or more impacts being administered against the sand separator of the known type. In one or more embodiments, the method further includes non-invasively mounting the one or more energy sensors to the sand separator of the known type. In one or more embodiments, the sand separator of the known type defines an internal region in which separated sand is adapted to be disposed; and the method further includes mounting the one or more energy sensors to the sand separator of the known type outside of the internal region. In one or more embodiments, the method further includes imparting, using one or more energy generators, the energy to the sand separator of the known type; wherein the one or more computers are further adapted to communicate with the one or more energy generators. In one or more embodiments, imparting, using the one or more energy generators, the energy to the sand separator of the known type includes administering one or more impacts against the sand separator of the known type; and detecting, using the one or more energy sensors, the response to the energy imparted to the sand separator of the known type includes detecting, using the one or more energy sensors, a vibrational response caused by the one or more impacts being administered against the sand separator of the known type. In one or more embodiments, the method further includes non-invasively mounting the one or more energy sensors to the sand separator of the known type; and non-invasively mounting the one or more energy generators to the sand separator of the known type. In one or more embodiments, the sand separator of the known type defines an internal region in which separated sand is adapted to be disposed; and the method further includes: mounting the one or more energy sensors to the sand separator of the known type outside of the internal region; and mounting the one or more energy generators to the sand separator of the known type outside of the internal region. In one or more embodiments, the one or more computers and/or the one or more energy sensors are pre-tuned based on: the known sand level(s) in the sand separator of the known type; and the detected response(s) to the energy imparted to the sand separator of the known type when the sand separator of the known type is filled with the known sand level(s). In one or more embodiments, the one or more computers and/or the one or more energy sensors are pre-tuned based on: the known sand level(s) in the another sand separator of the known type; and the detected response(s) to the energy imparted to the another sand separator of the known type when the another sand separator of the known type is filled with the known sand level(s).

It is understood that variations may be made in the foregoing without departing from the scope of the present disclosure.

In several embodiments, the elements and teachings of the various embodiments may be combined in whole or in part in some or all of the embodiments. In addition, one or more of the elements and teachings of the various embodiments may be omitted, at least in part, and/or combined, at least in part, with one or more of the other elements and teachings of the various embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several embodiments, while different steps, processes, and procedures are described as appearing as distinct acts, one or more of the steps, one or more of the processes, and/or one or more of the procedures may also be performed in different orders, simultaneously and/or sequentially. In several embodiments, the steps, processes, and/or procedures may be merged into one or more steps, processes and/or procedures.

In several embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several embodiments have been described in detail above, the embodiments described are illustrative only and are not limiting, and those skilled in the art will readily appreciate that many other modifications, changes and/or substitutions are possible in the embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112(f) for any limitations of any of the claims herein, except for those in which the claim expressly uses the word "means" together with an associated function.

What is claimed is:

1. A system for a sand separator of a known type, the system comprising:
   two or more energy sensors adapted to detect a response to energy imparted to the sand separator of the known type,
      wherein the two or more energy sensors are adapted to be vertically spaced apart along a height of the sand separator of the known type, and
      wherein the vertically-spaced-apart two or more energy sensors are adapted to be mounted to the sand separator of the known type to detect the response; and
   one or more computers adapted to communicate with the two or more energy sensors, the one or more computers being configured to determine an unknown sand level of separated sand accumulated in the sand separator of the known type;
   wherein the one or more computers and/or the two or more energy sensors are pre-tuned based on:
      known sand level(s) in:
         the sand separator of the known type, and/or
         another sand separator of a known type, and
      detected response(s) to energy imparted to:
         the sand separator of the known type when the sand separator of the known type is filled with the known sand level(s), and/or
         the another sand separator of the known type when the another sand separator of the known type is filled with the known sand level(s); and
   wherein the one or more computers are configured to determine the unknown sand level of separated sand accumulated in the sand separator of the known type based on:
      the response detected by the two or more energy sensors, and
      the pre-tuning of the two or more energy sensors and/or the one or more computers.

2. The system of claim 1,
   wherein the energy is imparted to the sand separator of the known type by one or more impacts administered against the sand separator of the known type; and
   wherein the response comprises a vibrational response caused by the one or more impacts administered against the sand separator of the known type.

3. The system of claim 1, further comprising:
   the sand separator of the known type;

wherein the vertically-spaced-apart two or more energy sensors are adapted to be non-invasively mounted to the sand separator of the known type.

4. The system of claim 1, further comprising:
the sand separator of the known type;
wherein the sand separator of the known type is adapted to separate the sand from a wellbore slurry;
wherein the sand separator of the known type defines an internal region in which the separated sand is adapted to accumulate; and
wherein the vertically-spaced-apart two or more energy sensors are adapted to be mounted to the sand separator of the known type outside of the internal region.

5. The system of claim 1, further comprising:
one or more energy generators adapted to impart the energy to the sand separator of the known type;
wherein the one or more computers are further adapted to communicate with the one or more energy generators.

6. The system of claim 5,
wherein the one or more energy generators comprise one or more strikers;
wherein the energy imparted to the sand separator of the known type comprises one or more impacts administered against the sand separator of the known type by the one or more strikers; and
wherein the response detected by the two or more energy sensors comprises a vibrational response caused by the one or more impacts administered against the sand separator of the known type by the one or more strikers.

7. The system of claim 5, further comprising:
the sand separator of the known type;
wherein the vertically-spaced-apart two or more energy sensors are adapted to be non-invasively mounted to the sand separator of the known type; and
wherein the one or more energy generators are adapted to be non-invasively mounted to the sand separator of the known type.

8. The system of claim 5, further comprising:
the sand separator of the known type;
wherein the sand separator of the known type is adapted to separate the sand from a wellbore slurry;
wherein the sand separator of the known type defines an internal region in which the separated sand is adapted to accumulate;
wherein the vertically-spaced-apart two or more energy sensors are adapted to be mounted to the sand separator of the known type outside of the internal region; and
wherein the one or more energy generators are adapted to be mounted to the sand separator of the known type outside of the internal region.

9. The system of claim 1,
wherein the one or more computers and/or the two or more energy sensors are pre-tuned based on:
the known sand level(s) in the sand separator of the known type; and
the detected response(s) to the energy imparted to the sand separator of the known type when the sand separator of the known type is filled with the known sand level(s).

10. The system of claim 1,
wherein the one or more computers and/or the two or more energy sensors are pre-tuned based on:
the known sand level(s) in the another sand separator of the known type; and
the detected response(s) to the energy imparted to the another sand separator of the known type when the another sand separator of the known type is filled with the known sand level(s).

11. A method for a sand separator of a known type, the method comprising:
detecting, using two or more energy sensors, a response to energy imparted to the sand separator of the known type,
wherein the two or more energy sensors are vertically spaced apart along a height of the sand separator of the known type, and
wherein the vertically-spaced-apart two or more energy sensors are mounted to the sand separator of the known type; and
determining, using one or more computers, an unknown sand level of separated sand accumulated in the sand separator of the known type, the one or more computers being adapted to communicate with the two or more energy sensors;
wherein the one or more computers and/or the two or more energy sensors are pre-tuned based on:
known sand level(s) in:
the sand separator of the known type, and/or
another sand separator of [[the]]a known type, and
detected response(s) to energy imparted to:
the sand separator of the known type when the sand separator of the known type is filled with the known sand level(s), and/or
the another sand separator of the known type when the another sand separator of the known type is filled with the known sand level(s); and
wherein the one or more computers determine the unknown sand level of separated sand accumulated in the sand separator of the known type based on:
the response detected by the two or more energy sensors, and the pre-tuning of the two or more energy sensors and/or the one or more computers.

12. The method of claim 11, further comprising:
imparting the energy to the sand separator of the known type;
wherein imparting the energy to the sand separator of the known type comprises administering one or more impacts against the sand separator of the known type; and
wherein detecting, using the two or more energy sensors, the response to the energy imparted to the sand separator of the known type comprises detecting, using the two or more energy sensors, a vibrational response caused by the one or more impacts being administered against the sand separator of the known type.

13. The method of claim 11,
wherein the vertically-spaced-apart two or more energy sensors are non-invasively mounted to the sand separator of the known type.

14. The method of claim 11,
wherein the sand separator of the known type is adapted to separate the sand from a wellbore slurry;
wherein the sand separator of the known type defines an internal region in which the separated sand is adapted to accumulate; and
wherein the vertically-spaced-apart two or more energy sensors are mounted to the sand separator of the known type outside of the internal region.

15. The method of claim 11, further comprising:
imparting, using one or more energy generators, the energy to the sand separator of the known type;
wherein the one or more computers are further adapted to communicate with the one or more energy generators.

16. The method of claim 15,
wherein imparting, using the one or more energy generators, the energy to the sand separator of the known type comprises administering one or more impacts against the sand separator of the known type; and
wherein detecting, using the two or more energy sensors, the response to the energy imparted to the sand separator of the known type comprises detecting, using the two or more energy sensors, a vibrational response caused by the one or more impacts being administered against the sand separator of the known type.

17. The method of claim 15,
wherein the vertically-spaced-apart two or more energy sensors are non-invasively mounted to the sand separator of the known type; and
wherein the one or more energy generators are non-invasively mounted to the sand separator of the known type.

18. The method of claim 15,
wherein the sand separator of the known type is adapted to separate the sand from a wellbore slurry;
wherein the sand separator of the known type defines an internal region in which the separated sand is adapted to accumulate; and
wherein the vertically-spaced-apart two or more energy sensors are mounted to the sand separator of the known type outside of the internal region; and
wherein the one or more energy generators are mounted to the sand separator of the known type outside of the internal region.

19. The method of claim 11,
wherein the one or more computers and/or the two or more energy sensors are pre-tuned based on:
the known sand level(s) in the sand separator of the known type; and
the detected response(s) to the energy imparted to the sand separator of the known type when the sand separator of the known type is filled with the known sand level(s).

20. The method of claim 11,
wherein the one or more computers and/or the two or more energy sensors are pre-tuned based on:
the known sand level(s) in the another sand separator of the known type; and
the detected response(s) to the energy imparted to the another sand separator of the known type when the another sand separator of the known type is filled with the known sand level(s).

* * * * *

UNITED STATES PATENT AND TRADEMARK OFFICE
CERTIFICATE OF CORRECTION

PATENT NO. : 11,772,015 B2
APPLICATION NO. : 17/509777
DATED : October 3, 2023
INVENTOR(S) : Barton Hickie et al.

It is certified that error appears in the above-identified patent and that said Letters Patent is hereby corrected as shown below:

In the Claims

In Claim 11:
Column 22, Line 23, delete "[[the]]" after -- separator of --

Signed and Sealed this
Twelfth Day of December, 2023

*Katherine Kelly Vidal*

Katherine Kelly Vidal
*Director of the United States Patent and Trademark Office*